US012771013B2

(12) United States Patent
Liu et al.

(10) Patent No.: US 12,771,013 B2
(45) Date of Patent: Oct. 20, 2026

(54) OMNIDIRECTIONAL COVERAGE BASE STATION ANTENNAS HAVING MODULAR REFLECTOR ASSEMBLIES AND/OR FEED NETWORKS

(71) Applicant: Outdoor Wireless Networks LLC, Claremont, NC (US)

(72) Inventors: Maosheng Liu, Suzhou (CN); Rui An, Richardson, TX (US); Zhaohui Liu, Suzhou (CN); Chengcheng Tang, Murphy, TX (US); Ruixin Su, Suzhou (CN); Fangwen Wan, Suzhou (CN); Puliang Tang, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 995 days.

(21) Appl. No.: 17/907,158

(22) PCT Filed: Sep. 8, 2021

(86) PCT No.: PCT/CN2021/117124

§ 371 (c)(1),
(2) Date: Mar. 16, 2023

(87) PCT Pub. No.: WO2023/035135

PCT Pub. Date: Mar. 16, 2023

(65) Prior Publication Data

US 2024/0213656 A1 Jun. 27, 2024

(51) Int. Cl.

*H01Q 1/24* (2006.01)
*H01Q 1/50* (2006.01)
*H01Q 15/18* (2006.01)

(52) U.S. Cl.

CPC ............... *H01Q 1/246* (2013.01); *H01Q 1/50* (2013.01); *H01Q 15/18* (2013.01)

(58) Field of Classification Search

CPC .......... H01Q 1/246; H01Q 1/50; H01Q 15/18; H01Q 21/24; H01Q 19/108; H01Q 21/205

See application file for complete search history.

(56) References Cited

U.S. PATENT DOCUMENTS

2003/0095076 A1* 5/2003 Lee ........................ H01Q 19/10 343/837
2018/0227775 A1* 8/2018 Bisiules ................. H01Q 21/08
(Continued)

FOREIGN PATENT DOCUMENTS

CN 202633517 U 12/2012
CN 108400428 A * 8/2018 ............ H01Q 1/246
(Continued)

OTHER PUBLICATIONS

"International Search Report and Written Opinion of the International Searching Authority", International Application No. PCT/CN2021/117124, May 27, 2022, 9 pp.

*Primary Examiner* — Dieu Hien T Duong
(74) *Attorney, Agent, or Firm* — Myers Bigel, P.A.

(57) ABSTRACT

A base station antenna includes a reflector assembly having at least first through third panels that are angled with respect to each other, first and second feed board PCBs that are mounted outwardly of the respective first panels of the reflector assembly, the first and second feed board PCBs including respective first and second RF transmission lines, and a feed line PCB having a third RF transmission line that connects directly to the first RF transmission line via a first tab-through-PCB connection and a fourth RF transmission line that connects directly to the second RF transmission line via a second tab-through-PCB connection.

15 Claims, 18 Drawing Sheets

(56) References Cited

U.S. PATENT DOCUMENTS

| | | | | |
|---|---|---|---|---|
| 2019/0028159 | A1 | 1/2019 | Bisiules et al. | |
| 2020/0220251 | A1* | 7/2020 | Ai | H01Q 19/108 |
| 2022/0037768 | A1 | 2/2022 | Zimmerman | |

FOREIGN PATENT DOCUMENTS

| | | | |
|---|---|---|---|
| CN | 111180884 | A | 5/2020 |
| CN | 112789766 | A | 5/2021 |
| EP | 3686991 | A1 | 7/2020 |
| JP | 2011229108 | A * | 11/2011 |

* cited by examiner

OMNIDIRECTIONAL COVERAGE BASE STATION ANTENNAS HAVING MODULAR REFLECTOR ASSEMBLIES AND/OR FEED NETWORKS

CROSS-REFERENCE TO RELATED APPLICATION

The present application is a 35 U.S.C. § 371 national stage application of PCT Application No. PCT/CN2021/117124, filed on Sep. 8, 2021, the disclosure of which is hereby incorporated herein in its entirety as if set forth fully herein.

FIELD

The present invention relates to cellular communications systems and, more particularly, to base station antennas that provide omnidirectional coverage in the azimuth plane.

BACKGROUND

Cellular communications systems are well known in the art. In a typical cellular communications system, a geographic area is divided into a series of regions that are referred to as "cells," and each cell is served by a base station. Typically, a cell may serve users who are within a distance of, for example, 2-20 kilometers from the base station, although smaller cells are typically used in urban areas to increase capacity. The base station may include baseband equipment, radios and one or more antennas that are configured to provide two-way radio frequency ("RF") communications with fixed and mobile subscribers ("users") that are positioned throughout the cell. Typically, a base station antenna includes one or more phase-controlled arrays of radiating elements, with the radiating elements arranged in one or more vertical columns when the antenna is mounted for use. Reference will be made herein to the azimuth plane, which is a horizontal plane (i.e., a plane that is parallel to the plane defined by the horizon) that bisects the base station antenna, and to the elevation plane, which is a plane extending along a boresight pointing direction of one of the arrays of radiating elements of a base station antenna that is perpendicular to the azimuth plane.

In order to increase capacity, cellular operators have widely deployed so-called "small cell" cellular base stations. A small cell base station refers to a low-power base station that may operate in the licensed and/or unlicensed spectrum that has a much smaller range than a typical "macrocell" base station. A small cell base station may be designed to serve users who are within short distances from the small cell base station (e.g., tens or hundreds of meters). Herein, the term "small cell" is used broadly to refer to base stations that serve smaller areas than conventional macrocell base stations, and thus the term "small cell" encompasses small cell, microcell, picocell and other base stations that serve small geographic regions. Small cell base stations may be used, for example, to provide cellular coverage to high traffic areas within a macrocell, which allows a macrocell base station to offload much or all of the traffic in the vicinity of a small cell to the small cell base station. Small cell base stations may be particularly effective in fourth generation ("4G") and fifth generation ("5G") cellular networks.

Small cell base stations typically employ a base station antenna that generates antenna beams that extend through a full 360° in the azimuth plane and that have a suitable beamwidth in the elevation plane. Such small cell base station antennas are often referred to as "omnidirectional" antennas since the antenna beam extends outwardly in all directions in the azimuth plane.

With the introduction of 4G and 5G cellular technologies, base stations now routinely employ radios and antennas that have multi-input-multi-output ("MIMO") capabilities. MIMO refers to a technique where a data stream that is to be transmitted is divided into multiple sub-components that are used to generate multiple RF signals that are simultaneously transmitted to a receiving device. The RF signals are transmitted using antenna arrays that are spatially separated from one another and/or at orthogonal polarizations to ensure that the RF signals are sufficiently decorrelated from one another. The receiving device recovers the multiple data streams from the received RF signals and reconstructs the original data stream. The use of MIMO transmission techniques may help overcome the negative effects of multipath fading, reflections and the like to provide enhanced transmission quality and capacity. Small cell base stations are often implemented in high-density urban environments. These environments may have numerous buildings which make these environments natural applications for using MIMO transmission techniques.

SUMMARY

Pursuant to embodiments of the present invention, base station antennas are provided that include a reflector assembly having at least first through third panels that are angled with respect to each other, a first feed board printed circuit board ("PCB") that is mounted outwardly of the first panel of the reflector assembly, the first feed board PCB including a first radio frequency ("RF") transmission line, a second feed board PCB that is mounted outwardly of the second panel of the reflector assembly, the second feed board PCB including a second RF transmission line, a first radiating element mounted to extend outwardly from the first feed board PCB, a second radiating element mounted to extend outwardly from the second feed board PCB, and a feed line PCB having a third RF transmission line that connects directly to the first RF transmission line via a first tab-through-PCB connection and a fourth RF transmission line that connects directly to the second RF transmission line via a second tab-through-PCB connection.

In some embodiments, the first tab-through-PCB connection may be a first tab on the feed line PCB that extends through a first opening in the first feed board PCB, the third RF transmission line extending onto the first tab and through the first opening, and the second tab-through-PCB connection may be a second tab on the feed line PCB that extends through a second opening in the second feed board PCB, the fourth RF transmission line extending onto the second tab and through the second opening.

In some embodiments, the feed line PCB may further include a power divider, and the third RF transmission line may be connected to a first output of the power divider and the fourth RF transmission line may be connected to a second output of the power divider.

In some embodiments, the first panel of the reflector assembly may be opposite the second panel of the reflector assembly.

In some embodiments, the reflector assembly may further include a fourth panel that is opposite the third panel, and the base station antenna may further comprise a third feed board PCB that is mounted outwardly of the third panel, the third feed board PCB including a fifth RF transmission line, and a fourth feed board PCB that is mounted outwardly of the fourth panel, the fourth feed board PCB including a sixth RF transmission line.

In some embodiments, the feed line PCB may include a seventh RF transmission line that connects directly to the fifth RF transmission line via a third tab-through-PCB connection and an eighth RF transmission line that connects directly to the sixth RF transmission line via a fourth tab-through-PCB connection.

In some embodiments, the feed line PCB may include a plurality of bridges that allow the third and fourth transmission lines and the seventh and eighth RF transmission lines to cross each other.

In some embodiments, the feed line PCB may be a first feed line PCB, and the base station antenna further includes a second feed line PCB having a seventh RF transmission line that connects directly to the fifth RF transmission line via a third tab-through-PCB connection and an eighth RF transmission line that connects directly to the sixth RF transmission line via a fourth tab-through-PCB connection.

In some embodiments, the third RF transmission line may be a microstrip transmission line having a feed trace on a first side of a dielectric substrate of the feed line PCB and a ground plane on a second side of the dielectric substrate of the feed line PCB, where the feed trace extends through an opening in the first feed board PCB and is connected to a feed trace of the first RF transmission line via a first solder joint, and the ground plane extends through the opening in the first feed board PCB and is connected to a ground plane of the first RF transmission line via a second solder joint and an interlayer connection structure of the first feed board PCB.

In some embodiments, the base station antenna may further comprise a support member, and the first through third panels of the reflector assembly may be mounted on the support member.

In some embodiments, the feed line PCB may be mounted on the support member.

In some embodiments, the first panel of the reflector assembly may be capacitively coupled to the second through third panels of the reflector assembly.

Pursuant to further embodiments of the present invention, base station antennas are provided that include a first dielectric support and a reflector assembly having a first panel, a second panel and a third panel that are angled with respect to each other, wherein each of the first through third panels is mounted to the first dielectric support. The first panel is capacitively coupled to the second panel.

In some embodiments, the reflector assembly may further comprise a fourth panel, and the first panel may also be capacitively coupled to the fourth panel.

In some embodiments, the reflector assembly may further comprise a fourth panel, and the third panel may be capacitively coupled to second panel and to the fourth panel.

In some embodiments, the second panel may be capacitively coupled to the third panel, and the first panel may be capacitively coupled to the third panel.

In some embodiments, each of the first through third panels may include a longitudinally-extending central reflector plate that has a first feed board PCB mounted thereon and first and second longitudinally-extending outer lips on either side of the central reflector plate that are angled with respect to the central reflector plate.

In some embodiments, the first longitudinally-extending outer lip of the first panel may be configured to form a plate capacitor with the second longitudinally-extending outer lip of the second panel.

In some embodiments, the first longitudinally-extending outer lip of the second panel may be configured to form a plate capacitor with the second longitudinally-extending outer lip of the third panel.

In some embodiments, the second longitudinally-extending outer lip of the first panel may be configured to form a plate capacitor with the first longitudinally-extending outer lip of the third panel.

In some embodiments, the reflector assembly may further comprise a fourth panel, and the first panel may also be capacitively coupled to the fourth panel, and the second longitudinally-extending outer lip of the first panel may be configured to form a plate capacitor with the first longitudinally-extending outer lip of the fourth panel, and the first longitudinally-extending outer lip of the third panel may be configured to form a plate capacitor with the second longitudinally-extending outer lip of the fourth panel.

In some embodiments, the reflector may further include a fourth panel, a fifth panel, a sixth panel, a seventh panel and an eighth panel. In some embodiments, the fifth panel may be integral with the first panel. In some embodiments, the first panel may be integral with the third panel.

In some embodiments, the base station antenna may further comprise a first feed board PCB that is mounted on the first panel and includes a first RF transmission line, a second feed board PCB that is mounted on the third panel and includes a second RF transmission line, and a feed line PCB that includes a third RF transmission line that connects directly to the first RF transmission line via a first tab-through-PCB connection and a fourth RF transmission line that connects directly to the second RF transmission line via a second tab-through-PCB connection.

In some embodiments, the first tab-through-PCB connection may be a first tab on the feed line PCB that extends through a first opening in the first feed board PCB, the third RF transmission line extending onto the first tab and through the first opening, and the second tab-through-PCB connection may be a second tab on the feed line PCB that extends through a second opening in the second feed board PCB, the fourth RF transmission line extending onto the second tab and through the second opening.

In some embodiments, the feed line PCB may further include a power divider, and the third RF transmission line may be connected to a first output of the power divider and the fourth RF transmission line may be connected to a second output of the power divider.

In some embodiments, the first panel may be opposite the third panel.

In some embodiments, the base station antenna may further comprise a third feed board PCB that is mounted outwardly of the second panel, the third feed board PCB including a fifth RF transmission line, and the second panel may be opposite the fourth panel, and a fourth feed board PCB that is mounted outwardly of the fourth panel, the fourth feed board PCB including a sixth RF transmission line.

In some embodiments, the feed line PCB has a seventh RF transmission line that connects directly to the fifth RF transmission line via a third tab-through-PCB connection and an eighth RF transmission line that connects directly to the sixth RF transmission line via a fourth tab-through-PCB connection.

In some embodiments, the feed line PCB includes a plurality of bridges that allow the third and fourth transmission lines and the seventh and eighth RF transmission lines to cross each other.

In some embodiments, the feed line PCB may be a first feed line PCB, the base station antenna further comprising a second feed line PCB having a seventh RF transmission line that connects directly to the fifth RF transmission line via a third tab-through-PCB connection and an eighth RF transmission line that connects directly to the sixth RF transmission line via a fourth tab-through-PCB connection.

In some embodiments, the third RF transmission line may be a microstrip transmission line having a feed trace on a first side of a dielectric substrate of the feed line PCB and a ground plane on a second side of the dielectric substrate of the feed line PCB, and the feed trace extends through an opening in the first feed board PCB and is connected to a feed trace of the first RF transmission line via a first solder joint, and the ground plane extends through the opening in the first feed board PCB and is connected to a ground plane of the first RF transmission line via a second solder joint and an interlayer connection structure of the first feed board PCB.

In some embodiments, the feed line PCB may be mounted on the first dielectric support.

In some embodiments, a plurality of cable-to-PCB connectors may be mounted in the dielectric support.

In some embodiments, a first of the cable-to-PCB connectors includes a plurality of ground contacts that are configured to be electrically connected to a feed board PCB of the base station antenna.

In some embodiments, the dielectric support includes a first piece and a second piece, and the cable-to-PCB connectors are captured between the first piece and the second piece.

Pursuant to still further embodiments of the present invention, base station antennas are provided that include a dielectric support, a plurality of cable-to-PCB connectors mounted in the dielectric support, a reflector mounted on the dielectric support, the reflector including at least first panel, a second panel and a third panel that are angled with respect to each other, and first through third feed board PCBs mounted on the respective first through third panels of the reflector. The first panel includes a first opening and the second panel includes a second opening, and PCB contacts on a first of the cable-to-PCB connectors extend through the first opening to electrically contact the first feed board PCB and PCB contacts on a second of the cable-to-PCB connectors extend through the second opening to electrically contact the second feed board PCB.

In some embodiments, the dielectric support includes a first piece and a second piece, and the cable-to-PCB connectors are captured between the first piece and the second piece.

In some embodiments, the first panel is capacitively coupled to the second panel.

DETAILED DESCRIPTION

Figure 1A:
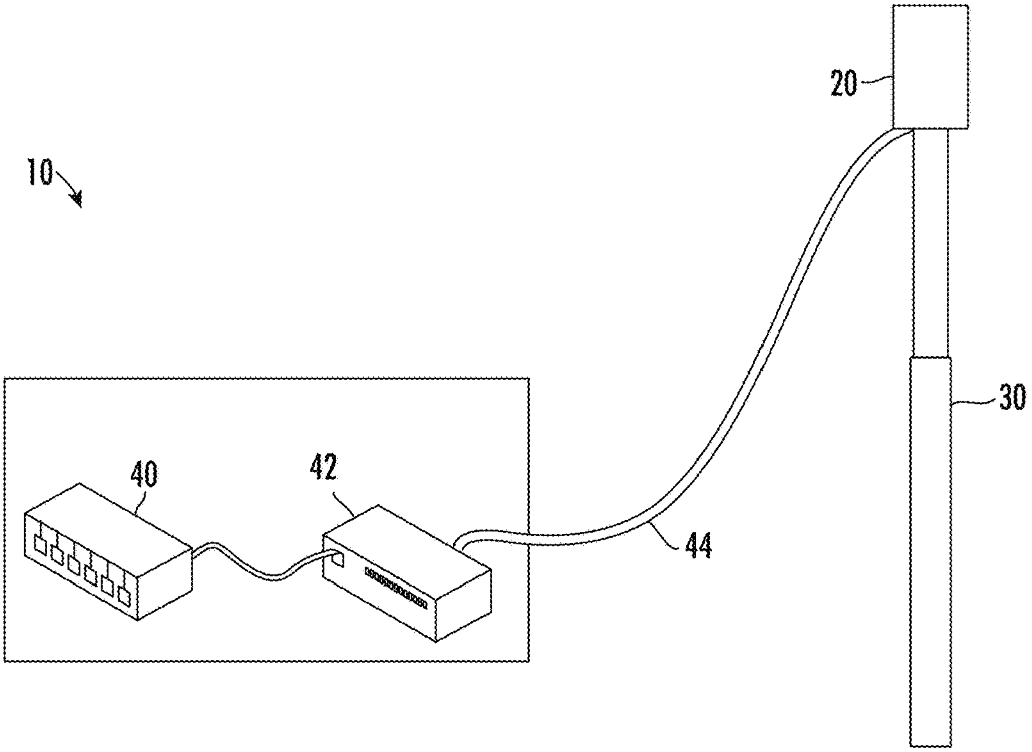
FIG. 1A is a highly simplified schematic diagram illustrating a small cell base station.

Pursuant to embodiments of the present invention, omnidirectional coverage base station antennas (e.g., small cell base station antennas) are provided that have modular reflector assemblies and/or feed networks that are simpler and/or better performing than conventional reflector assemblies and feed networks, and which may make the antenna easier to assemble. In some embodiments, the base station antennas include feed line printed circuit boards ("PCBs") that include integrated power dividers. RF transmission lines that are connected to the outputs of each power divider may connect directly to RF transmission lines on multiple feed board PCBs of the antenna that are mounted on different panels of the reflector assembly. The connections between the feed line PCBs and the feed board PCBs may be made using tab-through-PCB connections. In other embodiments, the small cell antennas include reflector supports that include a plurality of cable-to-PCB connectors mounted therein. The cable-to-PCB connectors may be used to directly connect cables of the feed network to RF transmission lines on multiple feed board PCBs of the antenna that are mounted on different panels of the reflector assembly.

The base station antennas according to certain embodiments of the present invention may include multi-part reflectors that include multiple distinct panels that are mounted on one or more dielectric supports. This may simplify fabrication of the antenna, and may allow different parts of the antenna to be assembled in parallel. In some embodiments, at least some of the panels of the reflector assembly may be capacitively coupled to other panels thereof.

In some example embodiments, small cell base station antennas are provided that include a reflector assembly having at least first through third panels that are angled with respect to each other. A first feed board PCB that includes a first RF transmission line is mounted outwardly of the first panel of the reflector assembly. A second feed board PCB that includes a second RF transmission line is mounted outwardly of the second panel of the reflector assembly. The antenna further includes a feed line PCB that has a third RF transmission line that connects directly to the first RF transmission line via a first tab-through-PCB connection and a fourth RF transmission line that connects directly to the second RF transmission line via a second tab-through-PCB connection.

In other embodiments, small cell base station antennas are provided that include a dielectric support, a plurality of cable- to PCB-connectors mounted in the dielectric support, a reflector mounted on the dielectric support, the reflector assembly including at least first through third panels that are angled with respect to each other and a plurality of feed board PCBs mounted on respective panels of the reflector assembly. The first panel includes a first opening and the second panel includes a second opening. PCB contacts on a first of the cable-to-PCB connectors extend through the first opening to electrically contact the first feed board PCB, and PCB contacts on a second of the cable-to-PCB connectors extend through the second opening to electrically contact the second feed board PCB.

In still other embodiments, small cell base station antennas are provided that include a dielectric support and a reflector assembly having a first panel, a second panel and a third panel that are angled with respect to each other. Each of the first through third panels is mounted to the dielectric support, and the first panel is capacitively coupled to the second panel.

Example embodiments of the invention will now be discussed in more detail with reference to the attached drawings.

Referring to FIG. 1A, a conventional small cell base station 10 is illustrated. The base station 10 includes an antenna 20 that may be mounted on a raised structure 30 such as a utility pole or an antenna tower. The antenna beams generated by the antenna 20 may be omnidirectional in the azimuth plane, meaning that the antenna beams extend through a full 360° circle in the azimuth plane, and may have a suitable beamwidth (e.g., 10-30°) in the elevation plane. The antenna beams generated by the antenna 20 may be slightly down-tilted in the elevation plane to reduce interference with adjacent base stations.

The small cell base station 10 further includes base station equipment such as baseband units 40 and radios 42. A single baseband unit 40 and a single radio 42 are shown in FIG. 1A to simplify the drawing, but it will be appreciated that more than one baseband unit 40 and/or radio 42 may be provided. Additionally, while the radio 42 is shown as being co-located with the baseband equipment 40 at the bottom of the antenna tower 30, it will be appreciated that in other cases the radio 42 may be a remote radio head that is mounted on the antenna tower 30 adjacent the antenna 20. As is known to those of skill in the art, the baseband unit 40 may receive data from another source such as, for example, a backhaul network (not shown) and may process this data and provide a data stream to the radio 42. The radio 42 may generate RF signals that include the data encoded therein and may amplify and deliver these RF signals to the antenna 20 for transmission via a cabling connection 44.

Figure 1B:
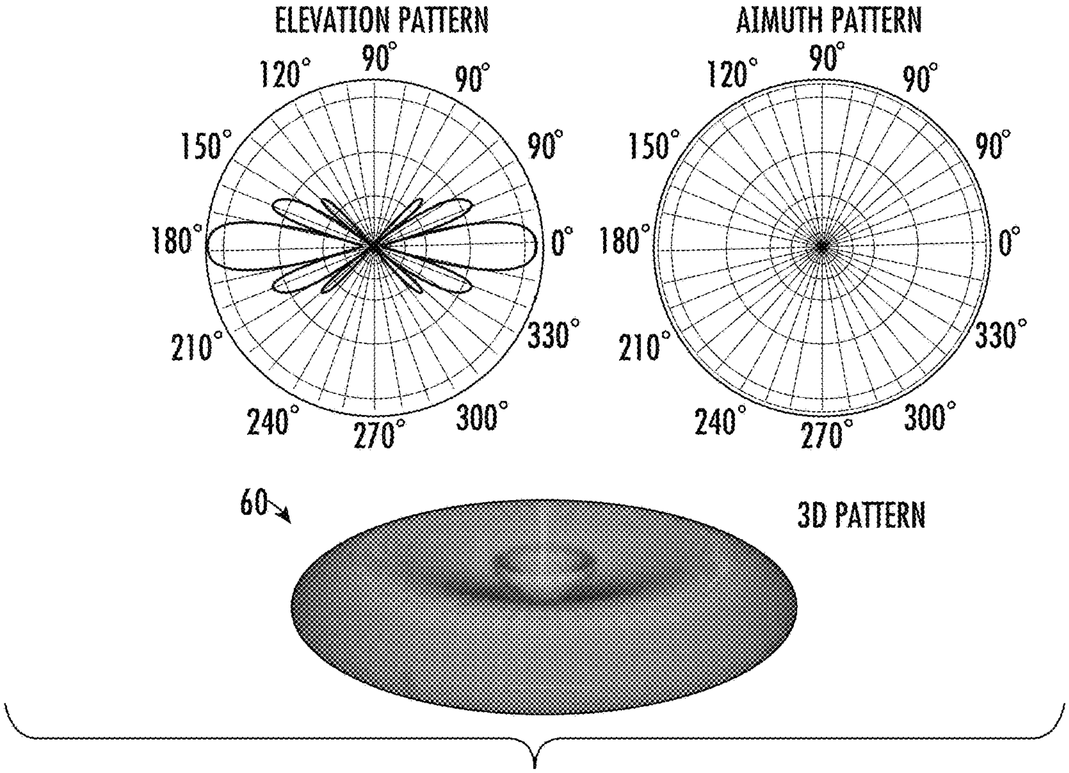
FIG. 1B illustrates an antenna beam that may be generated by the base station antenna of the small cell base station of FIG. 1A.

FIG. 1B is a composite of several views of an antenna beam 60 having an omnidirectional pattern in the azimuth plane that may be generated by the antenna 20. In particular, FIG. 1B includes a schematic three-dimensional view of the antenna beam 60 (labelled "3D pattern") as well as plots of the azimuth and elevation patterns thereof. The azimuth pattern is generated by taking a horizontal cross-section through the middle of the three dimensional antenna beam 60, and the elevation pattern is generated by taking a vertical cross-section through the middle of the three dimensional beam 60. The three-dimensional pattern in FIG. 1B illustrates the general shape of the generated antenna beam in three dimensions. As can be seen, the antenna beam 60 extends through a full 360° in the azimuth plane, and the antenna beam 60 may have a nearly constant gain in all directions in the azimuth plane. In the elevation plane, the antenna beam 60 has a high gain near the horizon, but the gain drops off dramatically both above and below the horizon. The antenna beam 60 thus is omnidirectional in the azimuth plane and directional in the elevation plane.

Figure 2A:
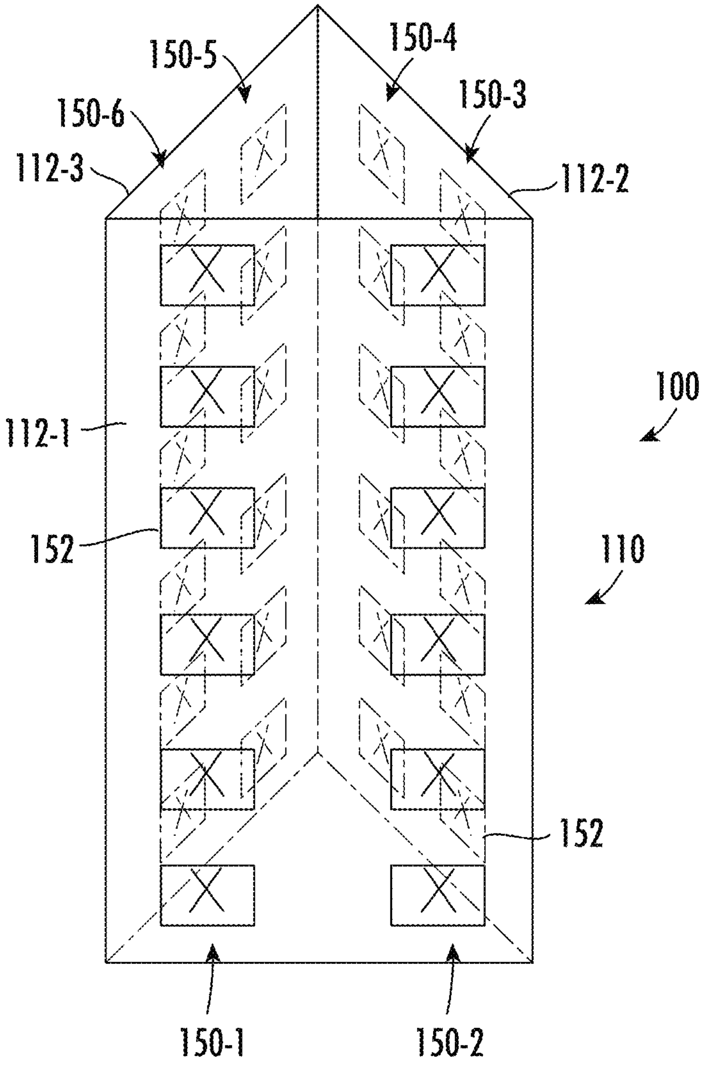
FIG. 2A is a schematic diagram illustrating a conventional omnidirectional small cell base station antenna that includes a three-sided reflector assembly.

FIG. 2A is a schematic diagram illustrating a small cell base station antenna 100 (with its radome removed) that may be used to implement the antenna 20 of FIG. 1A. The small cell base station antenna 100 includes a triangular reflector assembly 110 that includes three panels 112-1 through 112-3 that are arranged to define a tube having horizontal cross-sections that define equilateral triangles. The base station antenna 100 further includes six linear arrays 150-1 through 150-6 of radiating elements 152. Each panel 112 of the tubular triangular reflector assembly 110 may comprise a reflector that serves as a ground plane for the radiating elements 152 of the linear arrays 150 mounted thereon, and the panels 112 may comprise a unitary structure or may comprise a plurality of structures that are attached together. Herein, when multiple like or similar elements are provided they may be labelled in the drawings using a two part reference numeral. Such elements may be referred to herein individually by their full reference numeral (e.g., the panel 112-2) and may be referred to collectively by the first part of their reference numeral (e.g., the panels 112). Two linear arrays 150 are mounted on each panel 112. Each linear array 150 may extend perpendicular to the horizon (i.e., vertically) when the base station antenna 100 is mounted for use. The radiating elements 152 may comprise, for example, slant −45°/+45° cross-dipole radiating elements that each include a first dipole radiator that is configured to transmit and receive RF signals having a −45° polarization and a second dipole radiator that is configured to transmit and receive RF signals having a +45° polarization, and each radiating element 152 may extend outwardly from the panel 112 on which it is mounted. It will be appreciated that the base station antenna 100 may include a number of conventional components that are not depicted in FIG. 2A.

Figure 2B:
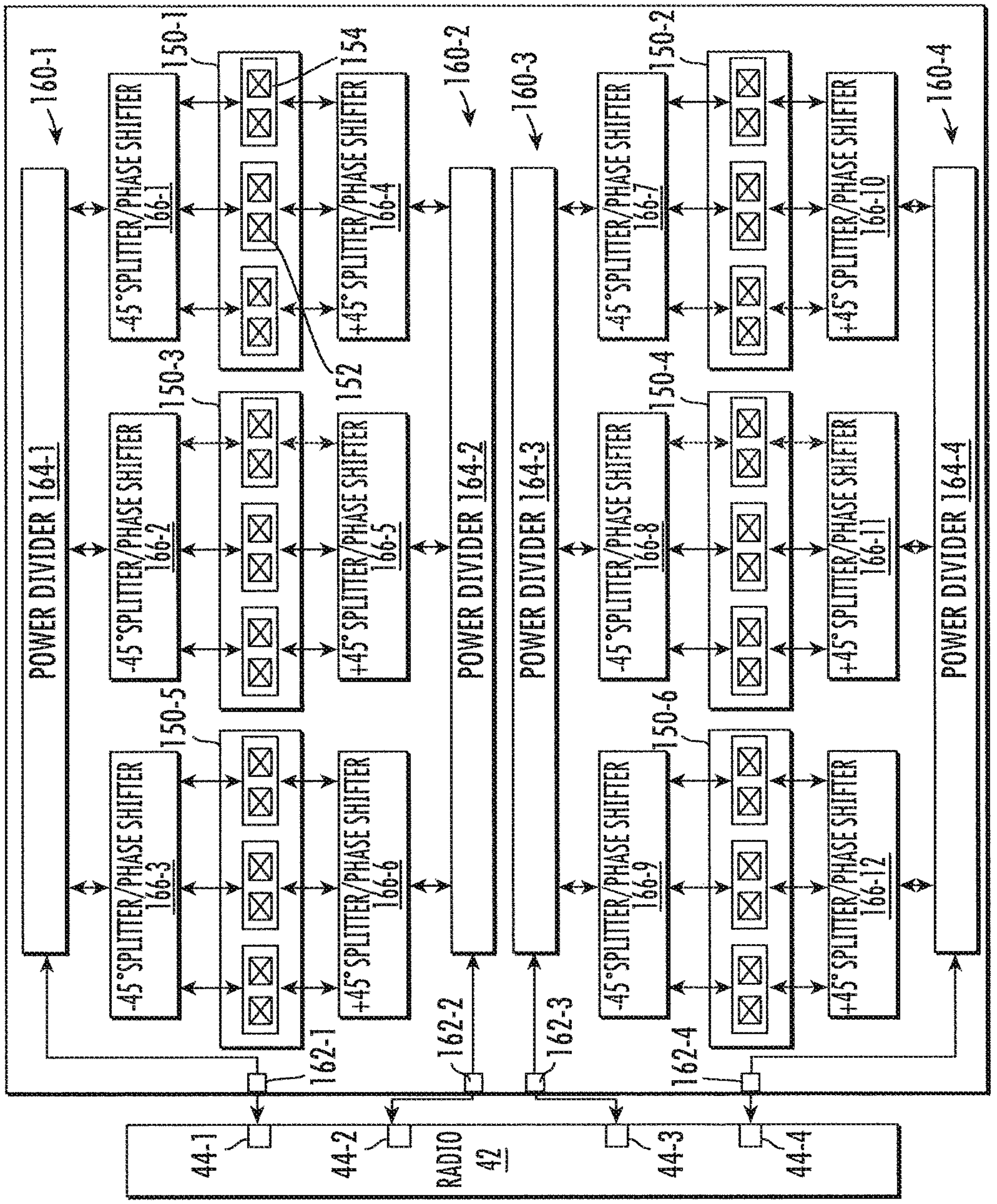
FIG. 2B is a block diagram illustrating a feed network for the base station antenna of FIG. 2A.

FIG. 2B illustrates an embodiment of four feed networks 160-1 through 160-4 that may be used to pass RF signals between a base station radio (e.g., base station radio 42 of FIG. 1A) and the radiating elements 152 of the linear arrays 150 of the antenna 100 of FIG. 2A. As shown in FIG. 2B, the radio 42 is a four port device having ports 44-1 through 44-4. Each feed network 160-1 through 160-4 includes a respective RF connector 162-1 through 162-4, and cables 46 (e.g., coaxial cables) may connect each port 44 on the radio 42 to a respective one of these RF connectors 162.

The first port 44-1 of radio 42 is coupled to the dipole radiators of the radiating elements 152 of linear arrays 150-1, 150-3, 150-5 that are arranged to transmit/receive signals having a −45° polarization via a first 1×3 power divider 164-1. An RF transmission line (e.g., a coaxial cable) may extend between the RF connector 162-1 and the power divider 164-1. The 1×3 power divider 164-1 may split RF signals received from port 44-1 into three equal power sub-components. Each output of the power divider 164-1 may be fed to a respective phase shifter 166-1, 166-2, 166-3. The phase shifters 166 may split the RF signals input thereto into a plurality of sub-components, and may apply a phase progression across the sub-components in order to apply a desired amount of electrical downtilt to the antenna beams generated in response to the RF signals fed through the first feed network 160-1. Each phase shifter 166 has three outputs, and each phase shifter output is connected to a respective one of three feedboards 154 that are included in each linear array 150. Each feedboard 154 receives a respective sub-component of the RF signal from the output of one of the phase shifters 166, splits the sub-component into two parts, and feeds each part to a −45° dipole radiator of a respective one of the radiating elements 152 mounted on the feedboard 154.

The second through fourth feed networks 160-2 through 160-4 may have the same design as the first feed network 160-1, except that feed networks 160-3 and 160-4 feed the radiating elements of linear arrays 150-2, 150-4, 150-6 instead of linear arrays 150-1, 150-3, 150-5, and feed networks 160-2 and 160-4 feed the +45° dipole radiators of the radiating elements 152 instead of the −45° dipole radiators. Accordingly, further description of feed networks 160-2 through 160-4 will be omitted. As shown in FIG. 2B, feed network 160-2 includes RF port 162-2, power divider 164-2 and phase shifters 166-4 through 166-6, feed network 160-3 includes RF port 162-3, power divider 164-3 and phase shifters 166-7 through 166-9, and feed network 160-4 includes RF port 162-4, power divider 164-4 and phase shifters 166-10 through 166-12.

As FIG. 2B makes clear, the four ports 44 on radio 42 may be used to simultaneously transmit four RF signals, with the first RF signal being transmitted though the −45° radiators of the radiating elements 152 of linear arrays 150-1, 150-3, 150-5, the second RF signal being transmitted though the +45° radiators of the radiating elements 152 of linear arrays 150-1, 150-3, 150-5, the third RF signal being transmitted though the −45° radiators of the radiating elements 152 of linear arrays 150-2, 150-4, 150-6, and the fourth RF signal being transmitted though the +45° radiators of the radiating elements 152 of linear arrays 150-2, 150-4, 150-6. Thus, the base station antenna 100 may implement 4T/4R MIMO by transmitting (and receiving) RF signals (at two different polarizations) through two different sets of three linear arrays. The antenna beams generated by antenna 100 may have a generally omnidirectional shape in the azimuth plane (with some amount of ripple) and a relatively narrow elevation beamwidth. The linear arrays 150 on each panel 112 may be spaced apart horizontally by, for example, about 1 wavelength of the center frequency of operation of the radiating elements 152 to ensure that sufficient spatial diversity is maintained.

Figure 3A:
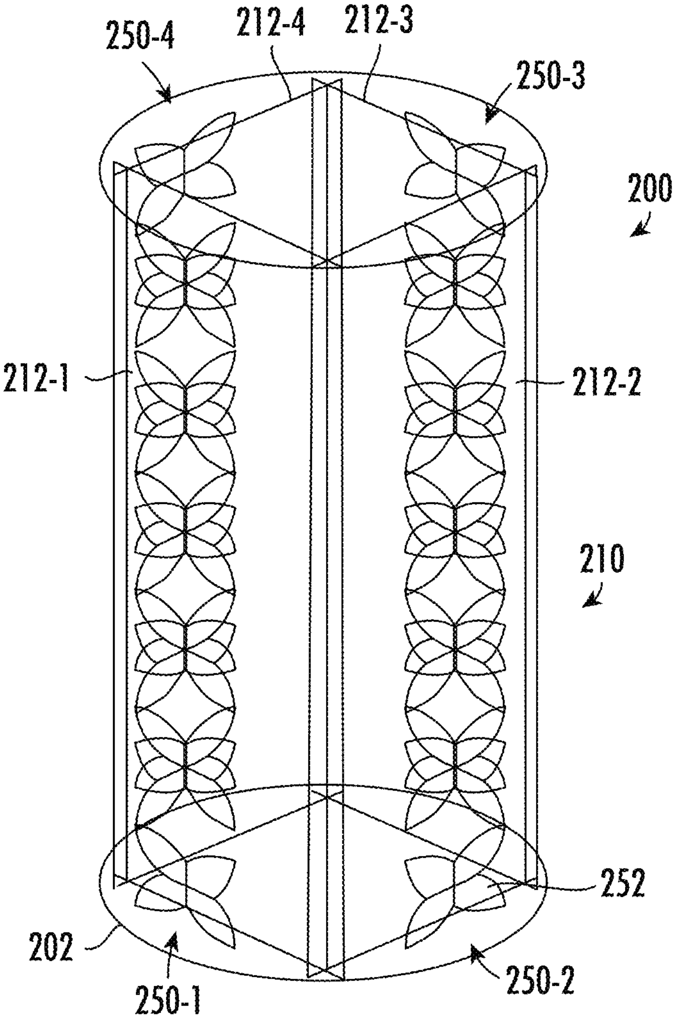
FIG. 3A is a schematic diagram illustrating another conventional omnidirectional small cell base station antenna that includes a four-sided reflector assembly.

FIG. 3A is a schematic diagram of another conventional small cell base station antenna 200 that forms two antenna beams (at each polarization) that have peanut-shaped horizontal cross-sections, where the two peanut-shaped antenna beams are rotated with respect to each other by 90° in the azimuth plane. Herein, a peanut shaped radiation pattern (antenna beam) refers to a radiation pattern having a bi-lobed cross-section through the azimuth plane, where the two lobes extend away from the antenna in opposite directions. While the peanut-shaped antenna beams are not omnidirectional, base station antenna 200 may provide coverage in all directions in the azimuth plane (i.e., provide omnidirectional coverage) since the peanut-shaped antenna beams are offset by 90° from each other in the azimuth plane.

As shown in FIG. 3A, the small cell base station antenna 200 includes a rectangular tubular reflector assembly 210 having four panels 212-1 through 212-4. The base station antenna 200 includes a total of four linear arrays 250-1 through 250-4 of radiating elements 252. Each panel 212 of reflector assembly 210 may comprise a reflector that serves as a ground plane for the radiating elements 252 mounted thereon. The radiating elements 252 are slant −45°/+45° cross-dipole radiating elements. The reflector assembly 210 may comprise a unitary structure or may comprise a plurality of structures that are attached together. Each linear array 250 is mounted on a respective one of the panels 212, and may be oriented vertically with respect to the horizon when the base station antenna 200 is mounted for use. The base station antenna 200 further includes a radome 202 that covers and protects the radiating elements 252 and other components of the base station antenna 200. The base station antenna 200 may further include a number of conventional components that are not depicted in FIG. 3A.

Figure 3B:
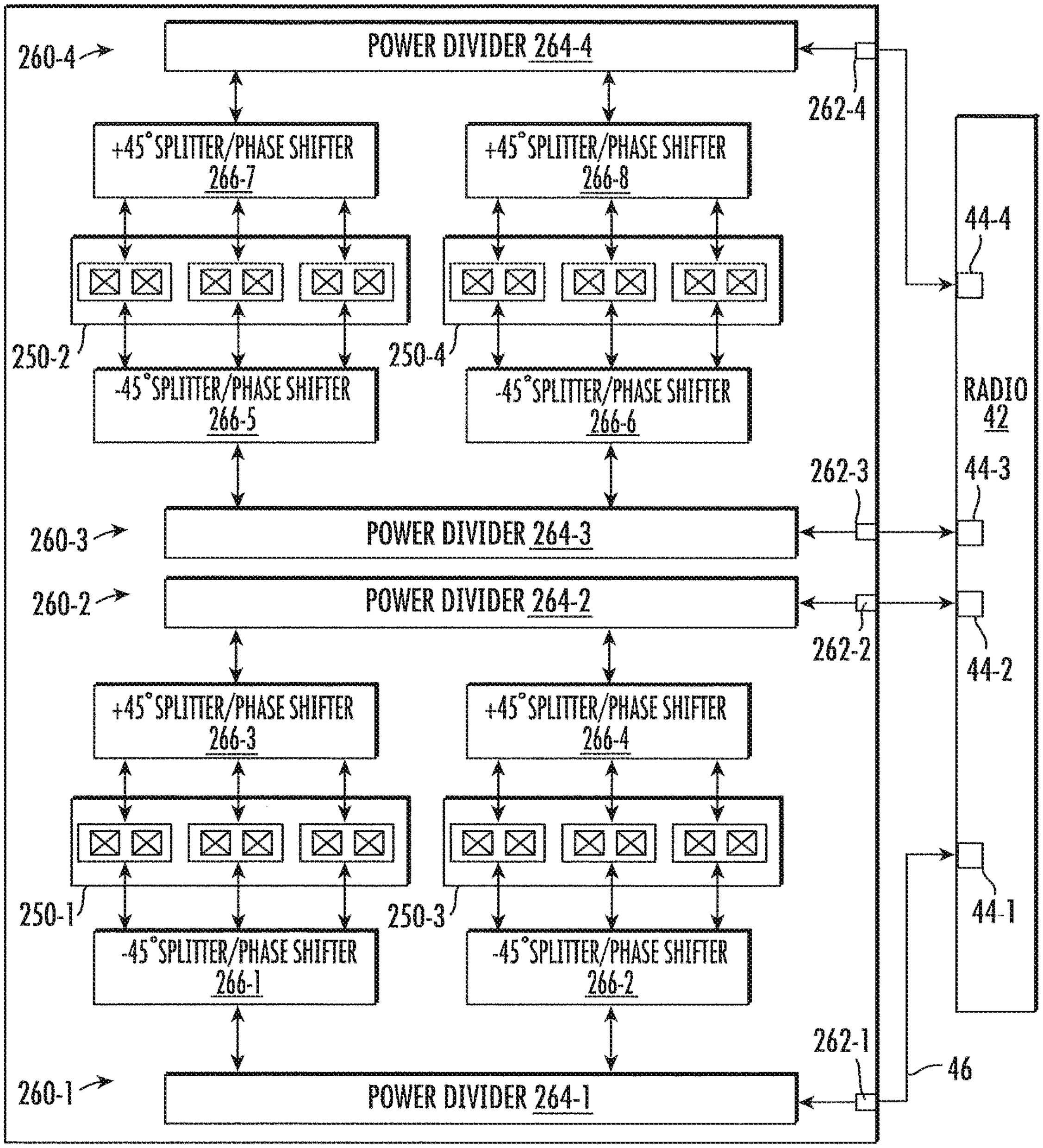
FIG. 3B is a block diagram illustrating a feed network for the base station antenna of FIG. 3A.

FIG. 3B illustrates feed networks 260-1 through 260-4 that may be used to pass RF signals between a base station radio 42 and the radiating elements 252 of base station antenna 200. The radio 42 is again a four port device having ports 44-1 through 44-4. Each feed network 260-1 through 260-4 includes a respective RF connector 262-1 through

262-4, and cables 46 (e.g., coaxial cables) may connect each port 44 on the radio 42 to a respective one of these RF connectors 262.

As shown in FIG. 3B the first port 44-1 of radio 42 is coupled to the −45° dipole radiators of the radiating elements 252 of linear arrays 250-1, 250-3 via a first 1×2 power divider 264-1. An RF transmission line (e.g., a coaxial cable) may extend between the RF connector 262-1 and the power divider 264-1. The 1×2 power divider 264-1 may split RF signals received from port 44-1 into two equal power sub-components. Each output of the power divider 264-1 may be fed to a respective phase shifter 266-1, 266-2 that is associated with a respective linear array 250-1, 250-3. The phase shifters 266-1, 266-2 may split the RF signals input thereto into a plurality of sub-components, and may apply a phase progression across the sub-components in order to apply a desired amount of electrical downtilt to the antenna beams generated in response to the RF signals fed through the first feed network 260-1. Each phase shifter 266 has three outputs, and each phase shifter output is connected to a respective one of three feedboards 254 that are included in each linear array 250. Each feedboard 254 receives a respective sub-component of the RF signal from the output of one of the phase shifters 266, splits the sub-component into two parts, and feeds each part to a −45° dipole radiator of a respective one of the radiating elements 252 mounted on the feedboard 254.

The second through fourth feed networks 260-2 through 260-4 may have the same design as the first feed network 260-1, except that feed networks 260-3 and 260-4 feed the radiating elements of the respective linear arrays 250-2, 250-4 instead of linear arrays 250-1, 250-3, and feed networks 260-2 and 260-4 feed the +45° dipole radiators of the radiating elements 252 instead of the −45° dipole radiators. Accordingly, further description of feed networks 260-2 through 260-4 will be omitted. As shown in FIG. 3B, feed network 260-2 includes RF port 262-2, power divider 264-2 and phase shifters 266-3, 266-4, feed network 260-3 includes RF port 262-3, power divider 264-3 and phase shifters 266-5, 266-6, and feed network 260-4 includes RF port 262-4, power divider 264-4 and phase shifters 266-7, 266-8.

As described above, the feed networks 260 include phase shifter assemblies 266 that both split RF signals (that travel in the transmit direction) input thereto into three sub-components and then apply a phase taper to the sub-components in order to impart a desired amount of electronic downtilt to the generated antenna beams. It will be appreciated, however, that the feed networks 260 may be simplified by replacing the phase shifters 266 with 1×3 power dividers so that only the power division is performed and the ability to place an adjustable phase taper to the sub-components is removed. This reduces the cost and complexity of the base station antenna, but eliminates the ability to apply remote electronic downtilt to the generated antenna beams. It will be appreciated that all of the antennas according to embodiments of the present invention that are discussed herein may include phase shifters in the feed networks thereof to provide remote electronic downtilt capabilities or may instead only include power dividers to reduce the cost of the antenna at the expense of giving up remote electronic downtilt capabilities.

The four ports 44 on radio 42 may be used to simultaneously transmit four RF signals, with the first RF signal being transmitted though the −45° radiators of the radiating elements 252 of linear arrays 250-1, 250-3, the second RF signal being transmitted though the +45° radiators of the radiating elements 252 of linear arrays 250-1, 250-3, the third RF signal being transmitted though the −45° radiators of the radiating elements 252 of linear arrays 250-2, 250-4 and the fourth RF signal being transmitted though the +45° radiators of the radiating elements 252 of linear arrays 250-2, 250-4. Thus, the base station antenna 100 may implement 4×MIMO by transmitting an RF signal at two different polarizations through two different sets of two linear arrays. The antenna beams generated by antenna 100 may have peanut-shaped cross-sections in the azimuth plane. The two antenna beams at each polarization may be rotated 90° with respect to each other in the azimuth plane so that together the two antenna beams provide omnidirectional coverage in the azimuth plane. The antenna beams may have a relatively narrow elevation beamwidth.

As the above description makes clear, the conventional small cell antennas 100, 200 described above use power dividers 164, 264 to split the RF signals that are fed thereto into multiple sub-components and then feed the sub-components to linear arrays 150, 250 that are mounted on different panels 112, 212 of the tubular reflector assemblies 110, 210. For example, in the small cell antenna 100 each RF signal is split into three sub-components that are fed to linear arrays 150 on each of the three panels 112 of the reflector assembly 110. In small cell antenna 200, each RF signal is split into two sub-components that are fed to two linear arrays 250 that are mounted on opposed panels 212 of the reflector assembly 210.

Figure 4A:
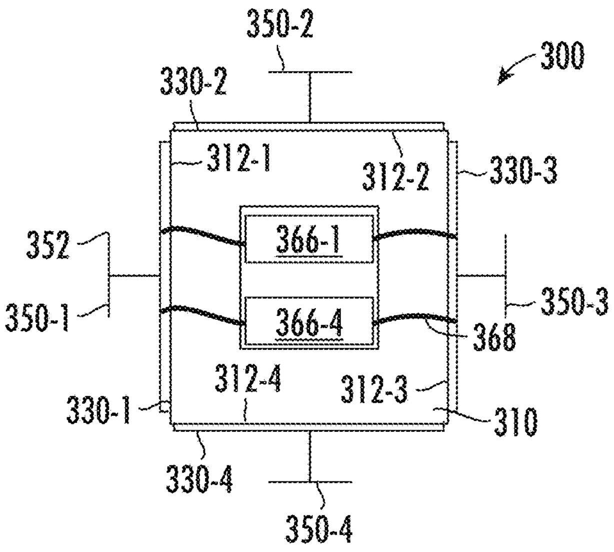
FIGS. 4A-4C are various views illustrating aspects of several conventional feed networks that are suitable for use with the small cell base station antenna of FIGS. 3A-3B.

A number of different methods have been proposed for splitting the RF signals and feeding the sub-components to linear arrays that are mounted on different panels of a reflector assembly. Referring to FIG. 4A, in a first approach, a base station antenna 300 includes a tubular reflector assembly 310 with feed board PCBs 330-1 through 330-4 mounted on the respective panels 312-1 through 312-4 of the reflector assembly 310. Linear arrays 350-1 through 350-4 of radiating elements 352 (only one radiating element 352 of each linear array 350 can be seen in the top view of FIG. 4A) are mounted on the respective feed board PCBs 330-1 through 330-4 of the reflector assembly 310. Four power dividers 366-1 through 366-4 are mounted inside the tubular reflector assembly 310, and the input of each power divider 366 is connected to a respective RF port (not shown) of antenna 300 (note that only two of the power dividers 366 and associated cables 368 are shown in FIG. 4A to simplify the drawing). Coaxial cables 368 are connected between the outputs of each power divider 366 and the respective feed board PCBs 330 that are fed by each power divider 366. Power divider 366-1 splits RF signals input at a first RF port of antenna 300 into two equal sub-components that are passed to feed board PCBs 330-1 and 330-3, respectively, where these sub-components are further split and fed to the −45° radiators of the radiating elements 352 on feed board PCBs 330-1 and 330-3. Similarly, power divider 366-4 splits RF signals input at a fourth RF port of antenna 300 into two equal sub-components that are passed to feed board PCBs 330-1 and 330-3, respectively, where these sub-components are further split and fed to the +45° radiators of the radiating elements 352 on feed board PCBs 330-1 and 330-3. It will be appreciated that the two power dividers 366 that are not shown in FIG. 4A split the RF signals input at the other two RF ports of the antenna and feed the split signals to feed boards 330-2 and 330-4.

With the feeding approach shown in FIG. 4A, the coaxial cables 368 are shielded from the radiating elements 352 by the reflector assembly 310, and the use of cabled connections keeps the insertion loss low. However, this approach requires routing coaxial cables 368 within the interior of the reflector assembly 310, which may interfere with other elements of the antenna 300 such as RET mechanical linkages (not shown). This approach also uses a large number of coaxial cables 368, and complicates assembly since various components are mounted within the tubular reflector assembly 310 where they are more difficult to install.

Figure 4B:
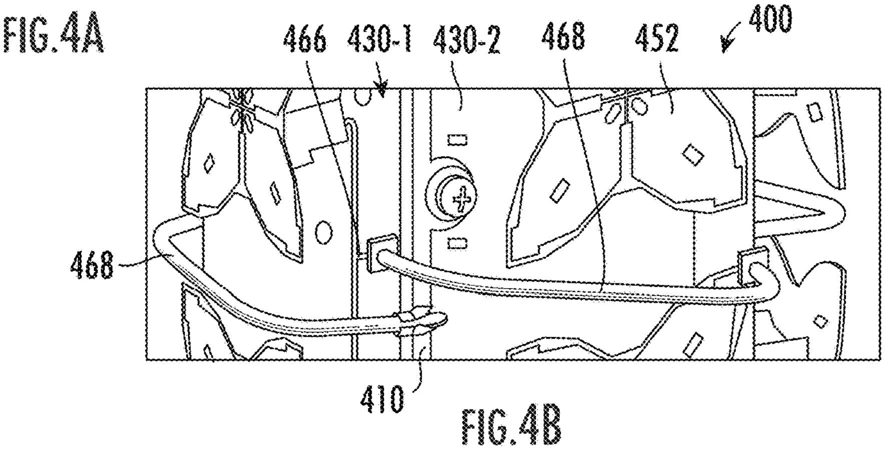

FIG. 4B illustrates a base station antenna 400 that uses another conventional approach for splitting RF signals that are fed to feed board PCBs mounted on different panels of a reflector assembly. As shown in FIG. 4B, a power divider 466 is formed in each feed board PCB 430. One output of each power divider 466 connects to an RF transmission line on the feed board PCB 430 that includes the power divider 466, while the other output of the power divider 466 is connected to a coaxial cable 468. As shown in FIG. 4B, each coaxial cable 468 may extend from a first feed board PCB 430 to another feed board PCB 430 where the coaxial cable connects to an RF transmission line. The coaxial cables 468 are routed around the outside of the tubular reflector assembly 410 in order to simplify the assembly process and to avoid interfering with other components (e.g., RET mechanical linkages) that are mounted inside the reflector assembly 410. This approach reduces the number of coaxial cables 468 required (requiring half the number included in base station antenna 300 of FIG. 4A) and simplifies assembly of the antenna 400. However, since the coaxial cables 468 are mounted outside the reflector assembly 410 there will be some degree of interaction between the coaxial cables 468 and the radiating elements 452, which reduces isolation, and ensuring consistent cable routing can also be difficult.

Figure 4C:
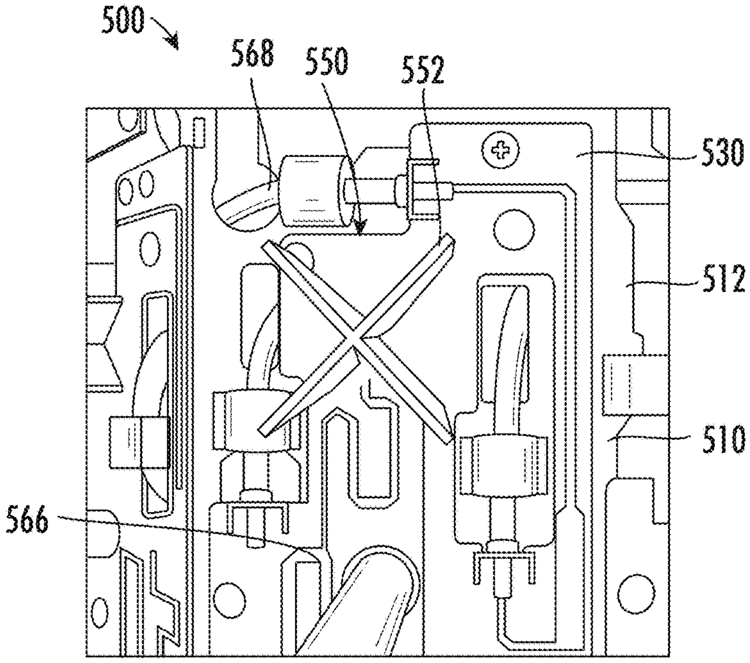

Referring to FIG. 4C, in a third approach, a small cell base station antenna 500 includes a plurality of feedboard PCBs 530 that have power dividers 566 implemented thereon that are used to split the RF signals that are fed thereto into two sub-components and then feed the sub-components to linear arrays 550 of radiating elements 552 that are mounted on the feedboard PCBs 530. The feed board PCBs 530 are mounted on the respective panels 512 of a tubular reflector assembly 510, and coaxial cables 568 are used to connect the second output of each power divider 566 to another feed board PCB 530. However, in this approach the coaxial cables 568 are routed through the interior of the tubular reflector assembly 510, thereby avoiding the isolation issues associated with the feeding approach of FIG. 4B. This approach again reduces the number of coaxial cables 568 required (in comparison to the approach of FIG. 4A), and ensures that the coaxial cables 568 do not have a significant impact on RF performance. However, the coaxial cables 568 occupy significant room on the feed board PCBs 530 (due to the fact that the end of each coaxial cable 568 extends in parallel to the feed board PCB 530 to which it is attached) and within the tubular reflector assembly 510, and complicate assembly of the antenna 500.

Pursuant to embodiments of the present invention, omnidirectional coverage small cell base station antennas are provided that have improved feed networks that overcome various of the disadvantages with conventional feed networks that are discussed above. In some embodiments, the feed networks may include one or more feed line PCBs. Each feed line PCB may include one or more power dividers and associated RF transmission lines. The feed line PCB(s) may be mounted generally perpendicular to the feed board PCBs of the antenna. Each feed line PCB may be electrically connected to the feed board PCBs using tab-through-PCB connections. Herein, a "tab-through-PCB connection" refers to an electrical connection between two PCBs in which a tab on the first PCB extends through a corresponding opening (e.g., a slit) on the second PCB. A first RF transmission line such as, for example, a microstrip transmission line, on the first PCB extends onto the tab. A trace of the first RF transmission line is immediately adjacent a trace of a second RF transmission line that is on the second PCB when the tab is inserted through the opening. The trace of the first RF transmission line may then be electrically connected (e.g., soldered) to the trace of the second RF transmission line. A ground plane of the first RF transmission line may likewise be electrically connected to a ground plane of the second RF transmission line (e.g., by a soldered connection).

Figure 5A:
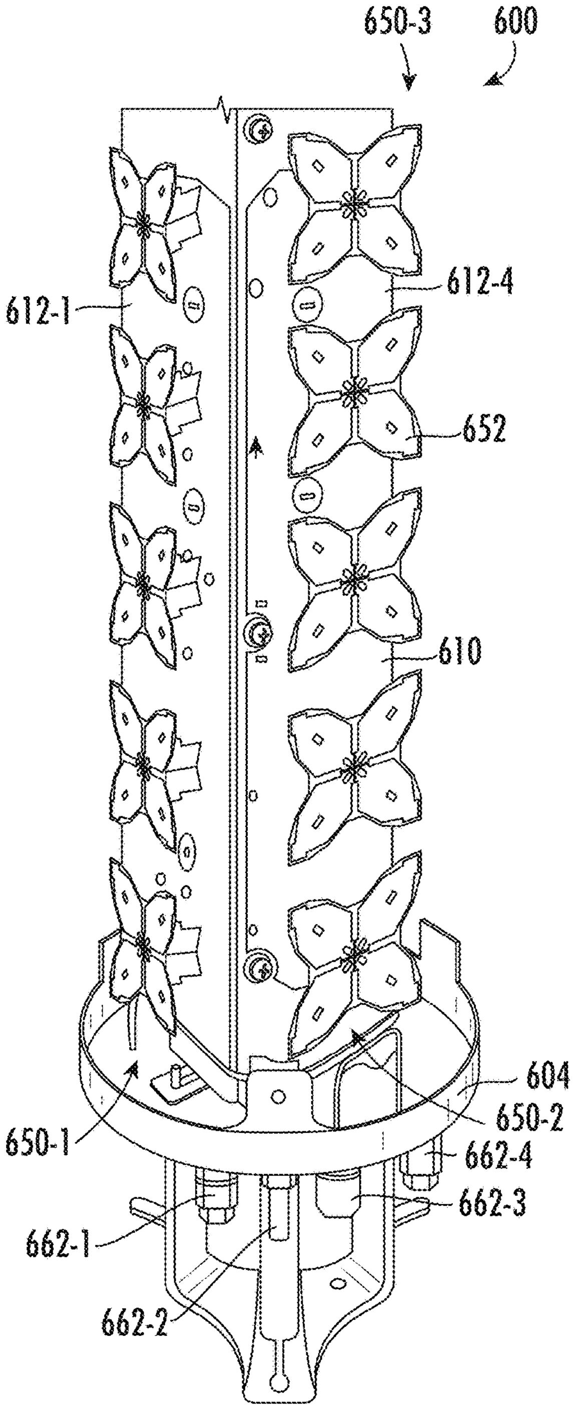
FIG. 5A is a partial perspective view of a base station antenna according to certain embodiments of the present invention.
Figure 5B:
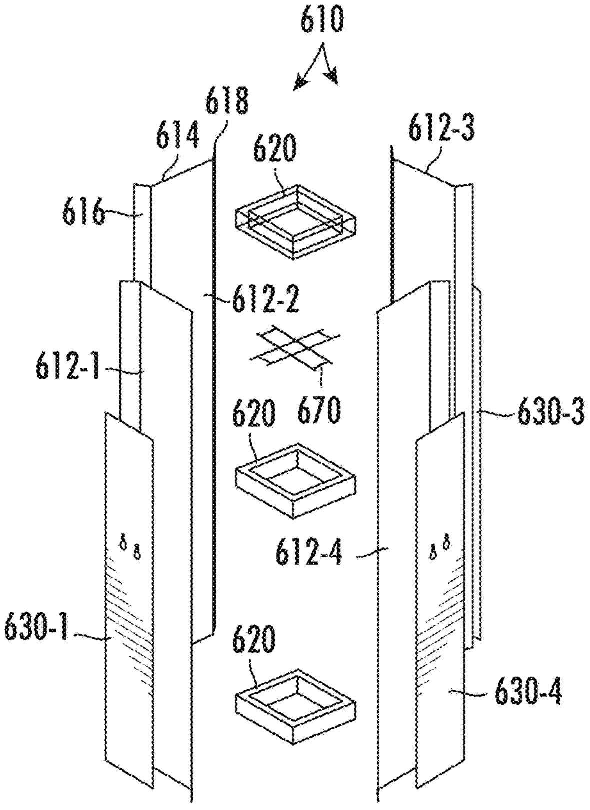
FIG. 5B is an exploded bottom perspective view of the reflector assembly, feed board PCBs and feed line PCB of the base station antenna of FIG. 5A.
Figure 5C:
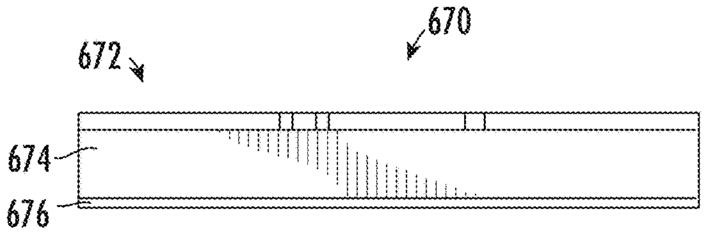
FIG. 5C is a side view of the feed line PCB shown in FIG. 5B.
Figure 5D:
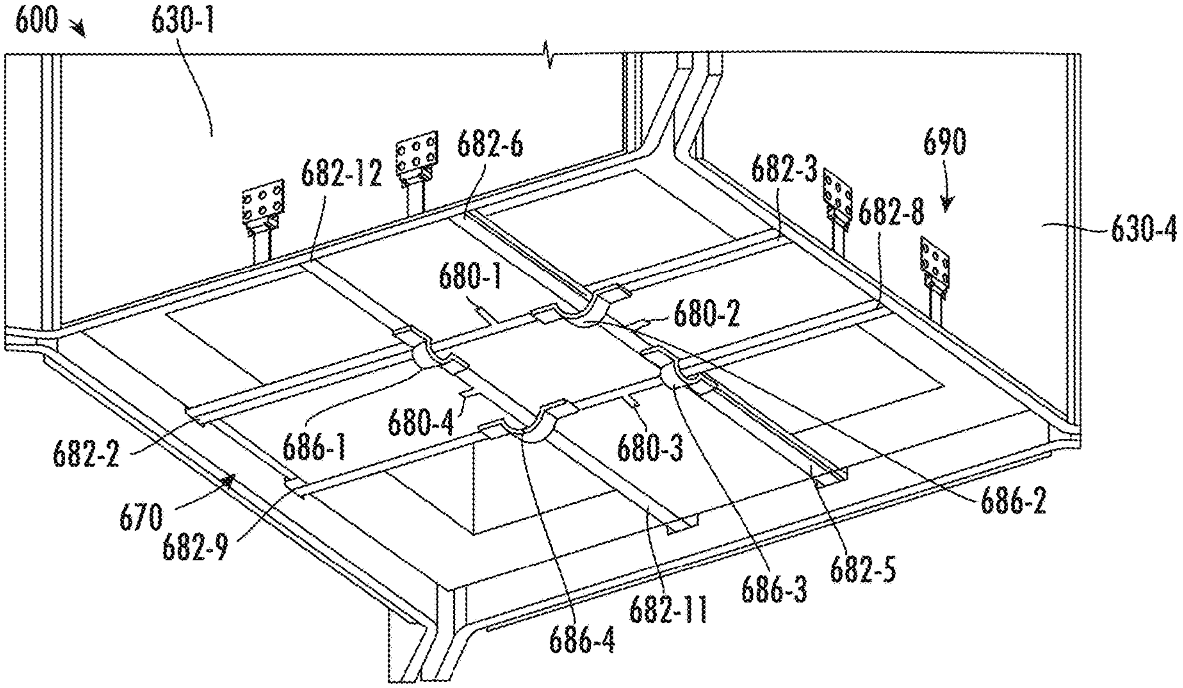
FIG. 5D and is a partial bottom view of the radome, reflector assembly, feed board PCBs and feed line PCB of the base station antenna of FIG. 5A.
Figure 5E:
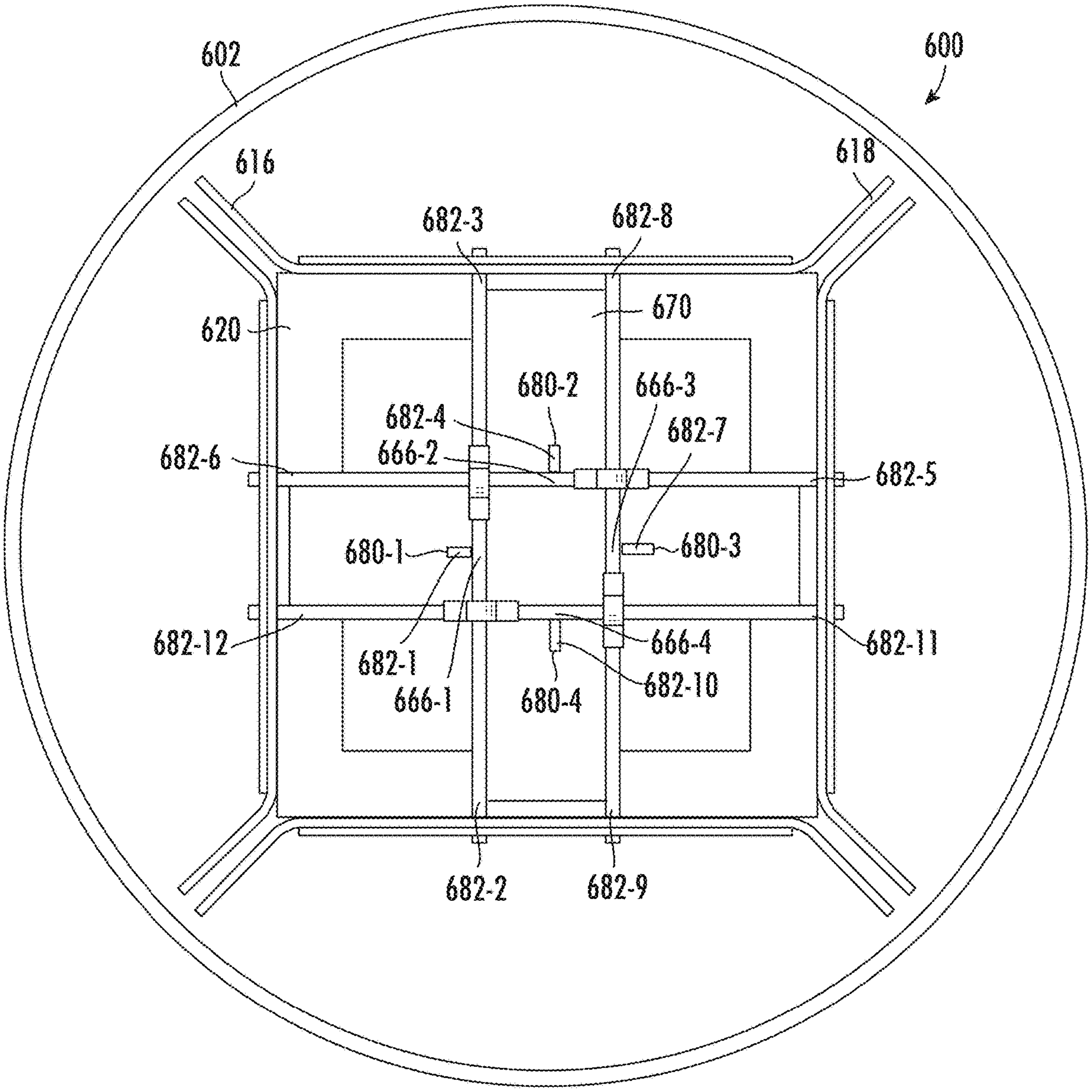
FIG. 5E is a horizontal cross-sectional view of the radome, reflector assembly, feed board PCBs and feed line PCB of the base station antenna of FIG. 5A.
Figure 5F:
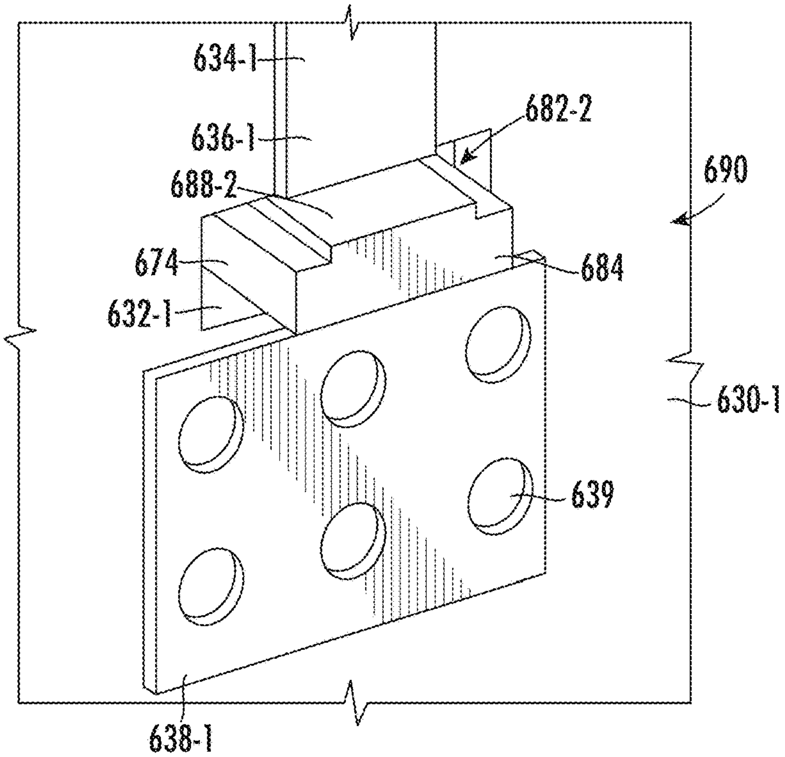
FIGS. 5F and 5G are top and bottom perspective views of one of the tab-through-PCB connections used to electrically connect the feed line PCB to the feed board PCBs in the antenna of FIG. 5A.
Figure 5G:
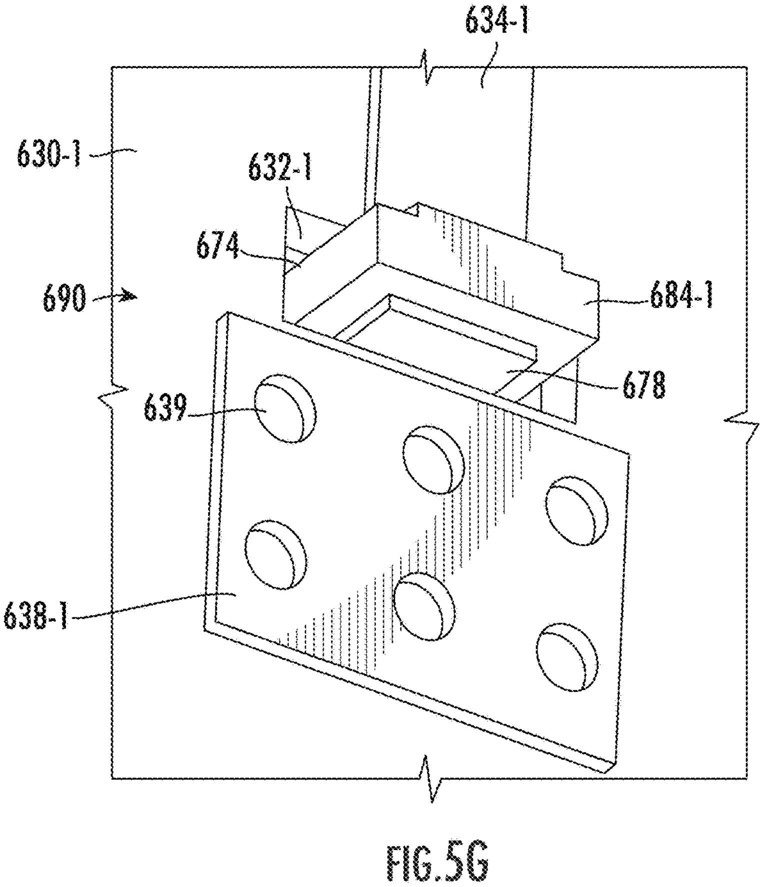

FIGS. 5A-5G depict an omnidirectional coverage small cell base station antenna 600 according to certain embodiments of the present invention. In particular, FIG. 5A is a schematic perspective view of the small cell base station antenna 600. FIG. 5B is an exploded perspective view of the reflector assembly, feed board PCBs and feed line PCB of the base station antenna 600. FIG. 5C is a side view of the feed line PCB shown in FIG. 5B. FIGS. 5D and 5E are a partial bottom perspective view and a horizontal cross-sectional view, respectively, of the reflector assembly, feed board PCBs and feed line PCB of the base station antenna 600. FIGS. 5F and 5G are top and bottom perspective views of one of the tab-through-PCB connections used to electrically connect the feed line PCB to the feed board PCBs in the antenna 600.

Referring to FIGS. 5A-5B, the small cell base station antenna 600 includes a rectangular tubular reflector assembly 610 having four panels 612-1 through 612-4. A respective one of four linear arrays 650-1 through 650-4 of radiating elements 652 (linear array 650-2 is not visible in the view of FIG. 5A) is mounted on each panel 612, with the radiating elements 652 extending outwardly from the panel 612 on which they are mounted. Each panel 612 may comprise a reflector that serves as a ground plane for the radiating elements 652 mounted thereon. The radiating elements 652 may be, for example, slant −45°/+45° cross-dipole radiating elements. The base station antenna 600 further includes a radome 602 (see FIG. 5E) that covers and protects the radiating elements 652 and other components of the base station antenna 600. The radome 602 may comprise a substantially cylindrical radome. Additionally, four RF connector ports 662-1 through 662-4 are mounted in a bottom end cap 604 of the antenna 600. The base station antenna 600 may further include a number of conventional components that are not depicted in FIG. 6A, such as for example, a top end cap, RET actuators and mechanical linkages and various cabling connections. These elements are omitted from the figures in order to emphasize certain novel aspects of the small cell base station antennas according to embodiments of the present invention.

Base station antenna 600 is very similar to the base station antenna 200 that is described above. At the block diagram level, the feed networks for base station antenna 600 may be identical to the feed networks 250-1 through 250-4 for base station antenna 200 that are shown in FIG. 3B. Thus, it will be appreciated that if all the reference numerals in FIG. 3B are increased by 400 then FIG. 3B would accurately depict the feed networks for the base station antenna 600. Accordingly, a figure and description corresponding to FIG. 3B will not be provided separately for base station antenna 600 in the interest of brevity. Like small cell base station 200, small cell base station antenna 600 is configured to form two antenna beams (at each polarization) that have peanut-shaped horizontal cross-sections, where the two peanut-shaped antenna beams are rotated with respect to each other by 90° in the azimuth plane. It will also be appreciated that the feed networks may or may not be implemented to include phase shifters in order to provide remote electronic downtilt capabilities, as discussed above.

As shown in FIG. 5B, the tubular reflector assembly 610 includes separate first through fourth panels 612-1 through 612-4. Each panel 612 includes a longitudinally-extending central reflector plate 614 and first and second longitudinally-extending outer lips 616, 618 that extend from opposed sides of the central reflector plate 614. The first and second longitudinally-extending outer lips 616, 618 are each angled with respect to the central reflector plate 614. The central reflector plate 614 of each panel 612 is angled with respect to the central reflector plates 614 of the panels 612 on either side thereof. In the depicted embodiment, the antenna 600 includes four panels 612, and the central reflector plate 614 of each panel 612 extends at an angle of 90° with respect to the central reflector plates 614 of the two adjacent panels 612.

Briefly referring to FIGS. 5D and 5E, each panel 612 may be spaced apart from the panels 612 adjacent thereto. The first longitudinally-extending outer lip 616 of each panel 612 may be positioned to form a plate capacitor with the longitudinally-extending capacitive coupling surface 618 of an adjacent panel 612. As a result, the four panels 612 may be capacitively coupled to each other so that the tubular reflector assembly 610 will exhibit a common reference (ground) potential across the four panels 612 thereof. Since the panels 612 are capacitively coupled to each other, they do not include metal-to-metal connections therebetween that could be a possible source of passive intermodulation ("PIM") distortion.

Referring to FIGS. 5B and 5D-5E, the tubular reflector assembly 610 also includes one or more dielectric supports 620. Each dielectric support 620 may have an annular rectangular shape (e.g., an annular square shape). Each panel 612 may be mounted on a respective side of each dielectric support 620 to assemble the tubular reflector assembly 610. The panels 612 may be mounted to the dielectric supports 620 using, for example, plastic screws or rivets or an adhesive (the mounting hardware is not shown in the figures).

Referring to FIGS. 5A-5B and 5D, four feed board PCBs 630 are provided, with a feed board PCB 630 mounted on the outer surface of each panel 612 of the tubular reflector assembly 610. While a single feed board PCB 630 is mounted on each central reflector surface 614 in the depicted embodiment, it will be appreciated that other configurations are possible. For example, a plurality of feed board PCBs 630 may be mounted on each central reflector surface 614 in other embodiments, and a plurality of feed line PCBs (discussed below) may be provided that connect to these feed board PCBs 630.

A feed line PCB 670 is also provided. As discussed above, in many small cell base station antennas, it is necessary to split an RF signal that is input to the antenna into two or more sub-components that are fed to the radiating elements mounted on different panels of a reflector assembly of the antenna, where the panels face in different directions. The feed line PCB 670 may be used to perform this splitting function and to feed the sub-components of the split RF signals to the feed board PCBs 630.

FIG. 5C is a side view of the feed line PCB 670 with the bridges 686 thereof (discussed below) omitted. As shown in FIG. 5C, the feed line PCB 670 may comprise an RF printed circuit board that includes a dielectric substrate 674 with first and second metal layers 672, 676 formed on opposed surfaces thereof. The first metal layer 672 may include signal traces and power divider junctions, as will be described in greater detail below. The second metal layer 676 may comprise a ground plane layer and may be implemented, for example, as a substantially solid sheet of metal.

As shown in FIGS. 5D and 5E, a variety of circuit elements may be implemented in the feed line PCB 670. These circuit elements include first through fourth input ports 680-1 through 680-4, first through fourth power dividers 666-1 through 666-4, first through twelfth RF transmission lines 682-1 through 682-12, first through eighth tabs 684-1 through 684-8, and first through fourth bridges 686-1 through 686-4.

The input ports 680-1 through 680-4 may comprise, for example, RF transmission line stubs that may have respective coaxial cables (not shown) connected thereto that connect each input port 680 of the feed line PCB 670 to a respective one of the RF connector ports 662. Each input port 680-1 through 680-4 may comprise a coaxial cable-to-microstrip transition in some embodiments.

As shown in FIGS. 5D-5E, the first input port 680-1 is connected to an input of the first power divider 666-1 by the first RF transmission line 682-1. The first power divider 666-1 may comprise, for example, a 1×2 power divider that splits RF signals input thereto from the first RF transmission line 682-1 into two equal magnitude sub-components that are output from the first power divider 666-1 onto the second and third RF transmission lines 682-2 and 682-3, respectively. The second input port 680-2 is connected to an input of the second power divider 666-2 by the fourth RF transmission line 682-4. The second power divider 666-2 may comprise, for example, a 1×2 power divider that splits RF signals input thereto from the fourth RF transmission line 682-4 into two equal magnitude sub-components that are output from the second power divider 666-2 onto the fifth and sixth RF transmission lines 682-5 and 682-6, respectively.

Similarly, the third input port 680-3 is connected to an input of the third power divider 666-3 by the seventh RF transmission line 682-7. The third power divider 666-3 may comprise, for example, a 1×2 power divider that splits RF signals input thereto from the seventh RF transmission line 682-7 into two equal magnitude sub-components that are output from the third power divider 666-3 onto the eighth and ninth RF transmission lines 682-8 and 682-9, respectively. The fourth input port 680-4 is connected to an input of the fourth power divider 666-4 by the tenth RF transmission line 682-10. The fourth power divider 666-4 may comprise, for example, a 1×2 power divider that splits RF signals input thereto from the tenth RF transmission line 682-10 into two equal magnitude sub-components that are output from the fourth power divider 666-4 onto the eleventh and twelfth RF transmission lines 682-11 and 682-12, respectively.

Each power divider 666 is illustrated in FIGS. 5D-5E as being implemented as a junction where three RF transmission lines 682 meet. It will be appreciated that other types of power dividers may be used. For example, in other embodiments, each power divider 666 may be implemented as a Wilkinson power divider.

Bridges 686 are used to allow the various RF transmission lines 682 to cross each other while remaining electrically isolated from each other. For example, a first bridge 686-1 allows the twelfth RF transmission line 682-12 to cross the second RF transmission line 682-2. The second bridge 686-2 allows the third RF transmission line 682-3 to cross the sixth RF transmission line 682-6. The third bridge 686-3 allows the fifth RF transmission line 682-5 to cross the eighth RF transmission line 682-8. The fourth bridge 686-4 allows the ninth RF transmission line 682-9 to cross the eleventh RF transmission line 682-11. In the depicted embodiment, each bridge 686 is implemented as a bent sheet metal element having ends that may be galvanically or capacitively coupled to portions of an RF transmission line 682 and a raised central section that crosses above another RF transmission line 682. It will be appreciated, however, that any appropriate bridge may be used in place of the depicted bridges 686, or bridges may be implemented within the feed line PCB by having the transmission line traces cross on different layers of the printed circuit board structure.

The feed line PCB 670 is electrically connected to the feed board PCBs 630 via a plurality of tab-through-PCB connections 690. As discussed above, herein a tab-through-PCB connection refers to a connection between a first RF transmission line on a first PCB and a second RF transmission line on a second PCB where the first RF transmission line extends onto a projecting tab of the dielectric substrate of the first printed circuit board and the second printed circuit board includes an opening such as a slit that is adjacent the second RF transmission line. The tab of the first PCB is inserted into the opening in the second PCB so that the conductors of the first RF transmission line on the first PCB may be electrically connected to the corresponding conductors of the second RF transmission line on the second PCB. One example embodiment of a suitable tab-through-PCB connections 690 is illustrated in FIGS. 5F-5G.

As shown in FIGS. 5F-5G, the feed line PCB 670 includes a first tab 684-1 in the form of a small portion of the dielectric substrate 674 of the feed line PCB 670 that projects from a major side of the dielectric substrate 674. The first tab 684-1 is simply a small extension of the feed line PCB 670. The second RF transmission line 682-2 extends onto the tab 684-1, meaning that the conductive trace 688-2 of the second RF transmission line 682-2 extends onto the upper surface of the first tab 684-1 and the ground plane 678 of the second RF transmission line 682-2 extends onto the lower surface of the first tab 684-1. The first tab 684-1 with the conductive trace 688-2 and ground plane 678 thereon is inserted through a first opening 632-1 in the form of a slit in the first feed board PCB 630-1. The first feed board PCB 630-1 includes a first feed board transmission line 634-1 formed therein, where the first feedboard transmission line 634-1 includes a conductive trace 636-1 that is formed on a first (outer) side of the dielectric substrate of the first feed board PCB 630-1 and a ground plane that is formed on an opposed (inner) side of the dielectric substrate. The conductive trace 636-1 of the first feed board transmission line 634-1 may extend up to or otherwise be near the first opening 632-1. As such, a first solder joint or other soldered connection (not shown) may be used to electrically connect the conductive trace 688-2 of the feed line PCB 670 to the conductive trace 636-1 of the first feed board transmission line 634-1.

A first conductive pad 638-1 is provided on the outer side of the dielectric substrate of the first feed board PCB 630-1. A plurality of conductive PCB layer transitions 639 such as plated through holes or metal-filled through holes extend through the dielectric substrate of the first feed board PCB 630 to electrically connect the first conductive pad 638-1 to a ground plane on the inner side of the first feed board PCB 630-1. As such, a second solder joint or other soldered connection may be used to electrically connect the ground plane 678 on the first tab 684-1 of the feed line PCB 670 to the first conductive pad 638-1 in order to electrically connect the ground plane 678 on the first tab 684-1 of the feed line PCB 670 to the ground plane of the first feed board PCB 630-1.

Referring again to FIGS. 5D-5E, it can be seen that two tab-through-PCB connections 690 are provided between the feed line PCB 670 and each feed board PCB 630, for a total of eight tab-through-PCB connections 690. The first tab-through-PCB connections 690 between the feed line PCB 670 and a given one of the feed board PCBs 630 may connect to the first dipole radiators (e.g., the −45° dipole radiators) of each of the radiating elements 652 mounted on the feed board PCB 630, and the second tab-through-PCB connection 690 between the feed line PCB 670 and one of the feed board PCBs 630 may connect to the second dipole radiators (e.g., the +45° dipole radiators) of each of the radiating elements 652 mounted on the feed board PCB 630.

Incorporating the power dividers 666 onto the feed line PCB 670 and using tab-through-PCB connection 690 to connect RF transmission lines 682 on the feed line PCB 670 to RF transmission lines 634 on the feed board PCBs 630 may provide a number of advantages. First, the feed network design of base station antenna 600 is quite simple, as the RF connector ports on antenna 600 may connect to a single feed line PCB 670 (e.g., via four coaxial cables), and the single feed line PCB 670 may provide all of the necessary electrical connections to the feed board PCBs 630. Second, as can be seen from the example embodiment described above, this approach may require as few as four coaxial cables in the feed network for an antenna that supports 4T/4R MIMO communications. Third, the coaxial cables of the feed network are within the inside of the tubular reflector assembly 610, and hence the radiating elements 652 do not "see" the coaxial cables and hence may be well isolated therefrom. Fourth, the modular reflector assembly structure (with each panel 612 comprising a separate component) can greatly simplify assembly of the antenna 600 (since radiating elements 652 may be assembled on each panel 612 independently), and connecting the feed line PCB 670 to the feed board PCBs 630 may be significantly simpler than the process of connecting and routing coaxial cables that is used in the conventional approaches discussed above with respect to FIGS. 4A-4C. Fifth, the amount of room required for the connections to the feed board PCBs 630 may be relatively small, which advantageously allows additional room on the feed board PCBs 630 for other elements of the antenna 600 and/or spacing the RF transmission lines 634 on the feed board PCBs 630 further apart, thereby increasing isolation. Sixth, the solder joints that may be formed in the tab-through-PCB connections 690 used to connect the feed line PCB 670 to the feed board PCBs 630 are formed on the outside of the tubular reflector assembly 610, which makes it much easier to form such solder joints.

While the base station antenna 600 includes a single feed line PCB 670 that includes all four power dividers 666, it will be appreciated that embodiments of the present invention are not limited thereto. For example, FIG. 6 illustrates a pair of feed line PCBs 670A, 670B that may be used in place of the feed line PCB 670 in base station antenna 600.

Figure 6:
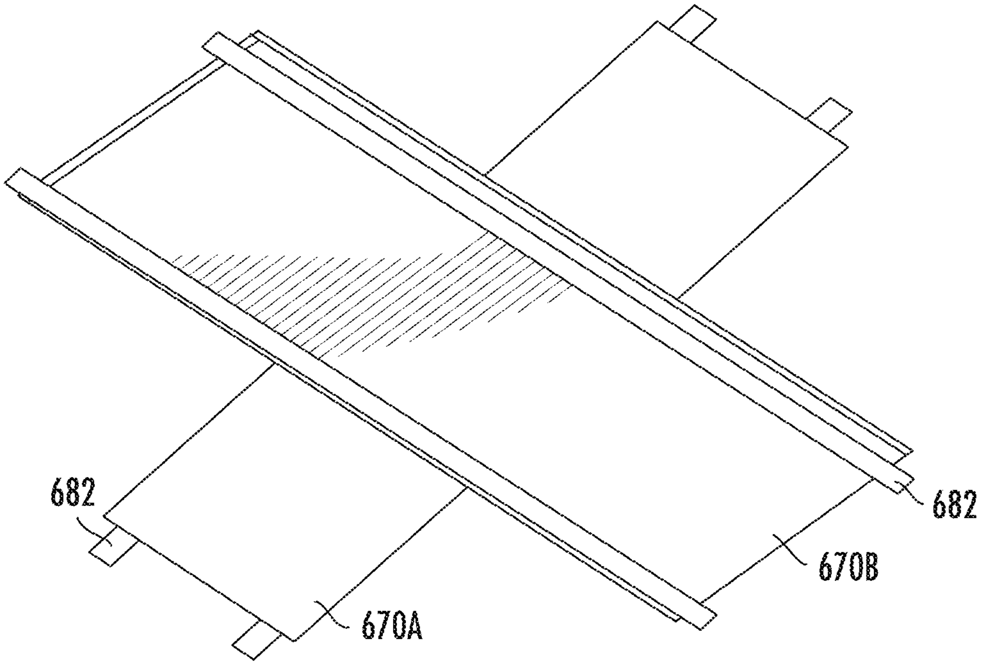
FIG. 6 is a perspective view of a pair of feed line PCBs according to embodiments of the present invention that may be used in place of the feed line PCB in the antenna of FIGS. 5A-5H.

Referring to FIG. 6, the feed line PCBs 670A, 670B may each be rectangular in shape, and hence significantly less PCB material may be required to form the two feed line 670A, 670B as compared to the single feed line PCB 670. This may reduce the cost of the antenna. In addition, when two feed line PCBs 670A, 670B are used instead of the single feed line PCB 670, the RF transmission lines 682 may be conveniently allowed to cross while maintaining isolation simply by mounting the two feed line PCBs 670A, 670B in a spaced apart arrangement. As such, the bridges 686 included on feed line PCB 670 may be omitted, which simplifies fabrication and removes potential sources of PIM distortion (namely the solder joints used to join the bridges to the transmission lines 682).

One potential disadvantage of the feed line PCB approach used in base station antenna 600 is that the RF transmission lines 682 on the feed line PCB 670 will exhibit higher insertion losses as compared to the coaxial cables used in the approaches of FIGS. 4A-4C. If the perimeter defined by a horizontal cross-section of the tubular reflector assembly 610 is relatively small, then the increase in insertion loss will typically be acceptable. However, some small cell antennas, such as small cell antennas supporting communications in several different frequency bands and/or small cell antennas including a large number of panels on the reflector assembly (e.g., 8, 12, 16 or more panels), may have large perimeters where the increased insertion loss may be too high for certain applications. In such applications, the feeding approach shown in the small cell base station antennas 700, 800 of FIGS. 7A-7E and 8A-8C may be used.

Figure 7A:
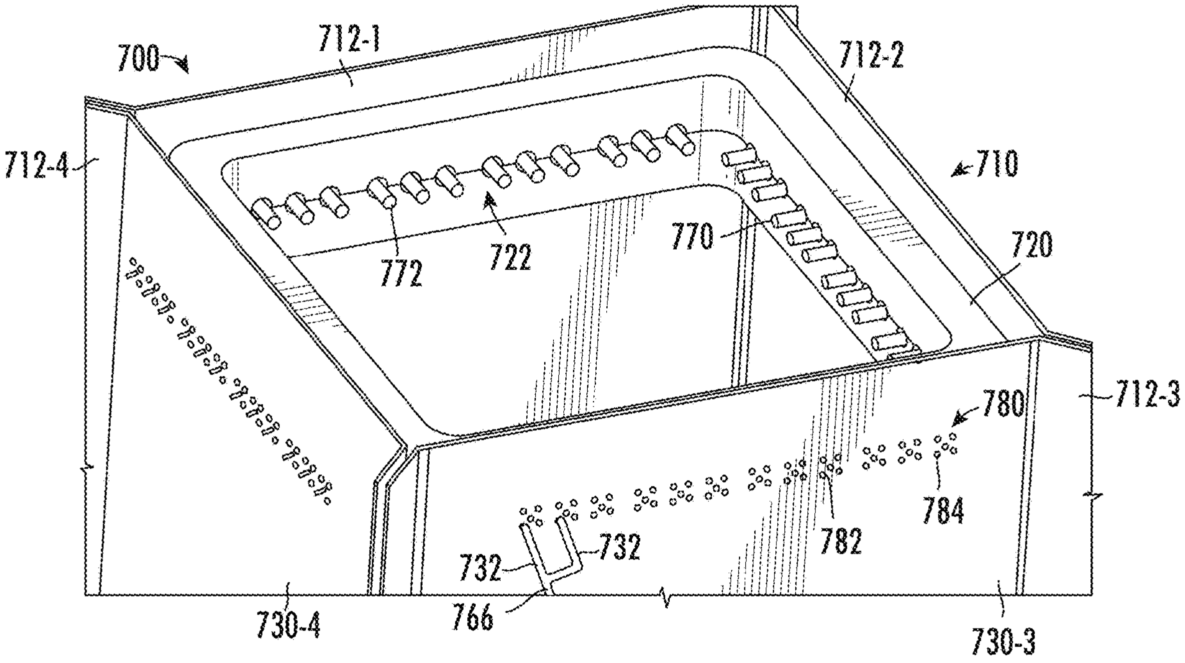
FIG. 7A is a partial perspective sectional view of a reflector assembly, dielectric support, feed board PCBs and cable-to-PCB connectors of a base station antenna according to further embodiments of the present invention.
Figure 7B:
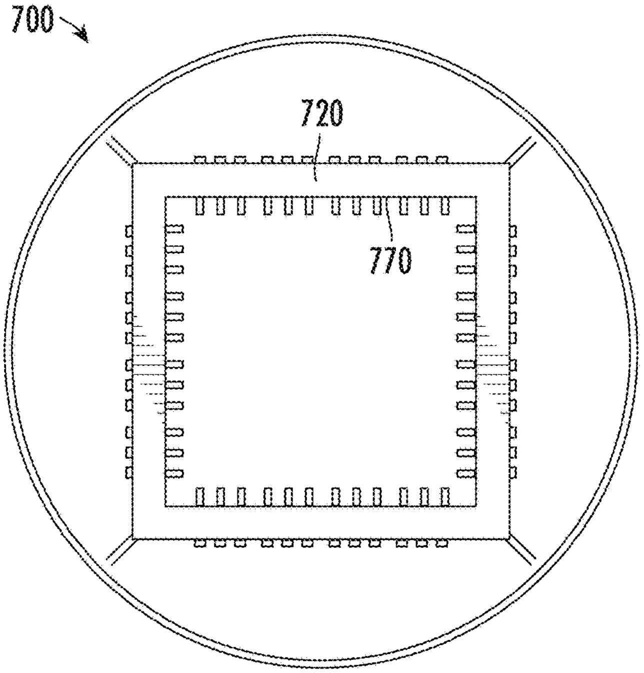
FIG. 7B is a cross-sectional view illustrating the radome, reflector assembly, dielectric support and cable-to-PCB connectors of the base station antenna of FIG. 7A.
Figure 7C:
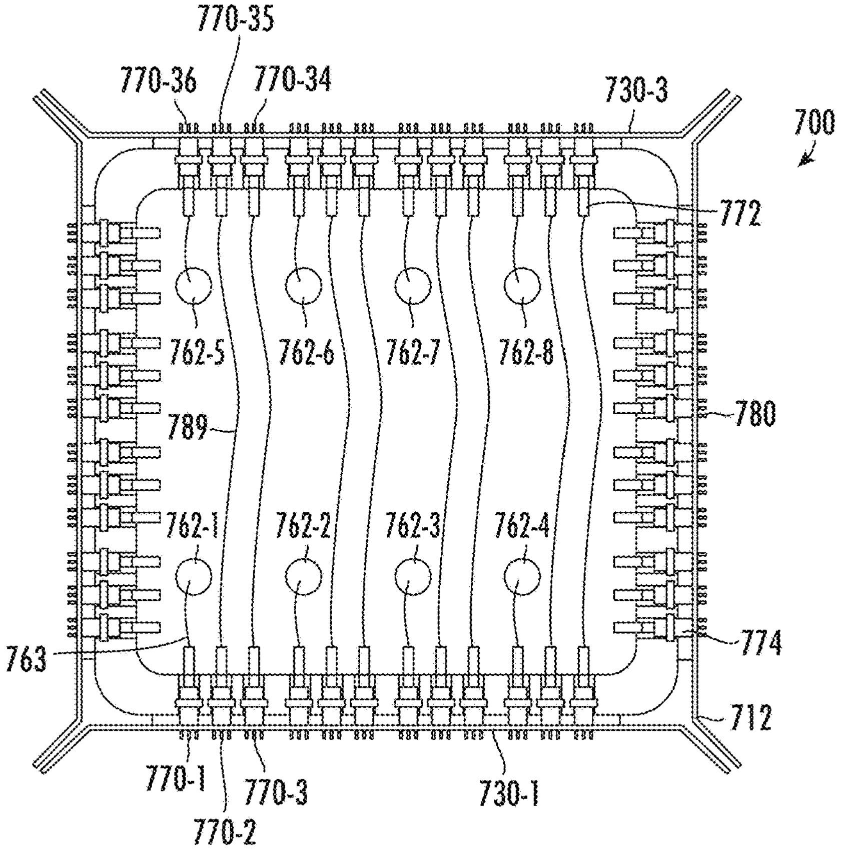
FIG. 7C is another cross-sectional view of the reflector assembly, dielectric support and cable-to-PCB connectors of the base station antenna of FIG. 7A.
Figure 7D:
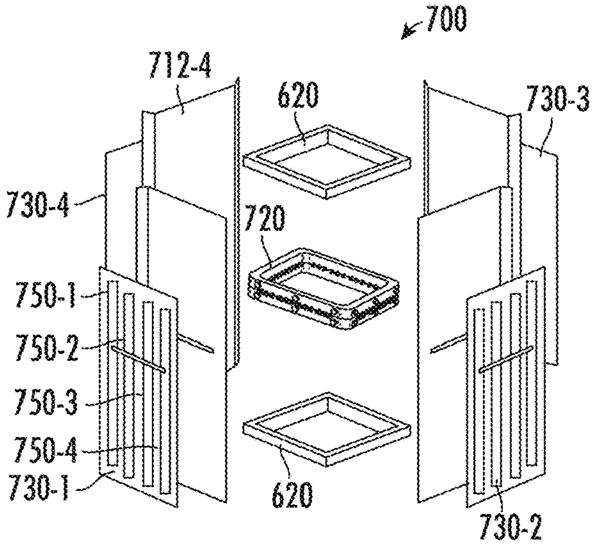
FIG. 7D is an exploded perspective view of the reflector assembly, feed board PCBs, dielectric supports and cable-to-PCB connectors of the base station antenna of FIG. 7A.
Figure 7E:
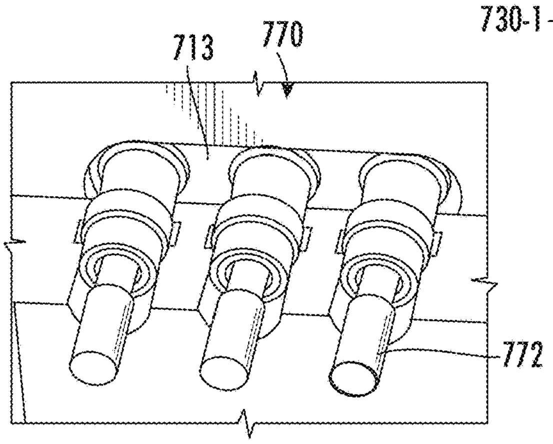
FIG. 7E is an enlarged perspective view of several of the cable-to-PCB connectors of the base station antenna of FIG. 7A illustrating how the connectors extend through an opening in a panel of the reflector assembly.

FIGS. 7A-7E depict an omnidirectional coverage small cell base station antenna 700 according to further embodiments of the present invention. In particular, FIG. 7A is a perspective cross-sectional view of certain components of the small cell base station antenna 700. FIGS. 7B and 7C are two different horizontal cross-sectional views illustrating the radome, reflector assembly, support and cable-to-PCB connectors of the base station antenna 700. FIG. 7D is an exploded perspective view of the reflector assembly, feed board PCBs, dielectric supports and cable-to-PCB connectors of the base station antenna 700, and FIG. 7E is an enlarged perspective view of several of the cable-to-PCB connectors of the base station antenna 700 illustrating how the connectors extend through an opening in a panel of the reflector assembly.

It should be noted that the base station antenna 700 of FIGS. 7A-7E differs from the base station antenna 600 described above in that base station antenna 700 includes four linear arrays 750 of radiating elements (shown schematically in FIG. 7D via vertically extending rectangles) per panel 712 of the tubular reflector assembly 710 whereas base station antenna 600 only includes a single linear array of radiating elements per panel 612 of the tubular reflector assembly 610. As a result, base station antenna 700 appears to have a more complex feed network than base station antenna 600, but this is primarily a result of the fact that base station antenna 700 is a significantly larger base station antenna with four times the number of linear arrays of radiating elements.

Referring first to FIGS. 7A-7D, it can be seen that base station antenna 700 includes a tubular reflector assembly 710 that is almost identical to the tubular reflector assembly 610 of base station 600, with the primary differences being that the feed line PCB 670 of antenna 600 is omitted and replaced with a plurality of cable-to-PCB connectors (discussed below) that are integrated into one of the dielectric supports 720 of the reflector assembly 710. As shown, the middle dielectric support 720 of base station antenna 700 has a plurality of openings 722 that hold the cable-to-PCB connectors 770. The dielectric support 720 may comprise, for example, a two piece clamshell dielectric support having upper and lower pieces, and the cable-to-PCB connectors 770 are captured therebetween. The cable-to-PCB connectors 770 (and associated cables) replace the feed line PCB 670 of base station antenna 600. A total of forty-eight cable-to-PCB connectors 770 are mounted in the dielectric support 720, which corresponds to three cable-to-PCB connectors 770 per linear array (since antenna 700 includes sixteen linear arrays 750, as discussed above). In contrast, base station antenna 600 includes two tab-to-PCB connections 690 per linear array 650. As will be described below, base station antenna 700 includes one additional connection per linear array because the power dividers are implemented on the feed board PCBs 730 of base station antenna 700 since no feed line PCB is provided in antenna 700.

Base station antenna 700 includes a total of sixteen RF connector ports 762 (eight of which are shown schematically in FIG. 7C). FIG. 7C also shows the feeding scheme for connecting eight of these RF connector ports 762-1 through 762-8 to two of the feed board PCBs 730 of antenna 700. The feeding scheme for connecting the remaining eight RF connector ports 762 to the other two feed board PCBs 730 is not shown in FIG. 7C to simplify the drawing, but it will be appreciated that the exact same feeding scheme is used.

As shown in FIG. 7C, RF connector port 762-1 is connected to a first cable-to-PCB connector 770-1 that connects to the first feed board PCB 730-1. The first RF connector port 762-1 may also be connected to, for example, a −45° polarization port of a radio (not shown). The first RF connector port 762-1 feeds both the first linear array 750-1 that is mounted on feed board PCB 730-1 as well as the fifth linear array 750-5 that is mounted on opposed feed board PCB 730-3.

Each cable-to-PCB connector 770 has a first end 772 that is configured to receive a coaxial cable 763 and a second end 774 that includes a PCB connector 780. The PCB connector 780 includes four outer contacts 782 (see FIG. 7A) that electrically connect an outer conductor of the coaxial cable 763 to a ground plane of the feed board PCB 730, and an inner contact 784 (see FIG. 7A) that connects to a trace of an RF transmission line 732 (FIG. 7A) on the feed board PCB 730. While not shown in the figures, the feed board PCBs 730 may include ground pads on the outer surface thereof that are connected to the ground planes on the reverse sides of the feed board PCBs 730 via plated through holes (or other conductive layer transfer structures) in order to electrically connect the four outer ground contacts 782 of each cable-to-PCB connector 780 to the ground planes of the feed board PCBs 730. The ground pads that are provided on the outer surfaces of the feed board PCBS 730 may be similar or identical to the ground pads 638 included on the feed board PCBs 630 of base station antenna 600. A first solder joint (not shown) may be used to electrically connect the four outer contacts 782 to the ground pad and a second solder joint and/or a plated through hole may be used to electrically connect the inner contact 784 to the trace of the RF transmission line 732 that is also provided on the outer surface of the feed board PCB 730. In some cases, the inner contact 784 may be the center conductor of a coaxial cable 763. As shown in FIG. 7E, each panel 712 of the tubular reflector assembly 710 includes one or more openings 713, and the second ends 774 of the cable-to-PCB connectors 770 extend through these openings to mate with the feed board PCBs 730.

RF signals that are fed to antenna 700 through RF connector port 762-1 are passed to the first feed board PCB 730-1 through the first cable-to-PCB connector 770-1. An RF transmission line 732 on the first feed board PCB 730-1 connects the first cable-to-PCB connector 770-1 to a 1×2 power divider 766 (the power dividers 766 are generally not shown in the figures, although one such power divider 766 is schematically shown in FIG. 7A for context) that is implemented in (or on) the first feed board PCB 730-1. The 1×2 power divider 766 may, for example, be identical to the power dividers 666 that are included in base station antenna 600, so further description of the power dividers 766 will be omitted. The first output of the 1×2 power divider 766 is connected (e.g., through a phase shifter or another power divider) to the −45° dipole radiators of the radiating elements of the first linear array 750-1. The second output of the 1×2 power divider 766 is connected via an RF transmission line 732 on the first feed board PCB 730-1 to the second cable-to-PCB connector 770-2.

Still referring to FIG. 7C, the second cable-to-PCB connector 770-2 is connected via a coaxial cable 789 to the thirty-fifth cable-to-PCB connector 770-35. An RF transmission line 732 on the third feed board PCB 730-3 connects (e.g., through a phase shifter or another power divider) the thirty-fifth cable-to-PCB connector 770-35 to the −45° dipole radiators of the radiating elements of the fifth linear array 750-5. Thus, an RF signal that is input at RF connector port 762-1 is passed to feed board 730-1 through the first cable-to-PCB connector 770-1 where it is split into two subcomponents. The first sub-component is passed to the −45° dipole radiators of the first linear array 750-1 and the second sub-component is passed to the −45° dipole radiators of the fifth linear array 750-5 via the second and thirty-fifth cable-to-PCB connectors 770-2, 770-35.

In a similar fashion, RF signals that are fed to antenna 700 through RF connector port 762-5 are passed to the third feed board PCB 730-3 through the thirty-sixth cable-to-PCB connector 770-36. An RF transmission line 732 on the third feed board PCB 730-3 connects the thirty-sixth cable-to-PCB connector 770-36 to a 1×2 power divider 766 that is implemented in the third feed board PCB 730-3. The first output of this 1×2 power divider 766 is connected (e.g., through a phase shifter or another power divider) to the +45° dipole radiators of the radiating elements of the fifth linear array 750-5. The second output of the 1×2 power divider 766 is connected via an RF transmission line 732 on the third feed board PCB 730-3 to the thirty-fourth cable-to-PCB connector 770-34.

Still referring to FIG. 7C, the thirty-fourth cable-to-PCB connector 770-34 is connected via a coaxial cable 789 to the third cable-to-PCB connector 770-3. An RF transmission line 732 on the first feed board PCB 730-1 connects (e.g., through a phase shifter or another power divider) the third cable-to-PCB connector 770-3 to the +45° dipole radiators of the radiating elements of the first linear array 750-1. Thus, an RF signal that is input at RF connector port 762-5 is passed to the third feed board 730-3 through the thirty-sixth cable-to-PCB connector 770-36 where it is split into two subcomponents. The first sub-component is passed to the +45° dipole radiators of the fifth linear array 750-5 and the second sub-component is passed to the +45° dipole radiators of the first linear array 750-1 via the thirty-fourth and third cable-to-PCB connectors 770-34, 770-3.

The second linear array 750-2 that is mounted on the first feed board 730-1 and the sixth linear array 750-6 that is mounted on the third feed board 730-3 may be fed from the second and sixth RF connector ports 762-2, 762-6 in the same manner as described above for the first and fifth linear arrays 750-1, 750-5, and hence further description thereof will be omitted. Similarly, the third linear array 750-3 that is mounted on the first feed board 730-1 and the seventh linear array 750-6 that is mounted on the third feed board 730-3 may be fed in the exact same manner, as may the fourth linear array 750-4 that is mounted on the first feed board 730-1 and the eighth linear array 750-8 that is mounted on the third feed board 730-3.

It will be appreciated that any appropriate number of cable-to-PCB connectors 770 may be mounted in the dielectric support 720. In the depicted embodiment, a total of forty-eight cable-to-PCB connectors 770 are provided, which is the appropriate number for feeding the four linear arrays 750 per panel of antenna 700. The number may be varied, for example, if different numbers of linear arrays 750 are provided, or if the number of panels 712 of the reflector assembly 710 is varied. For example, if only one linear array 750 is provided per panel 712, then the total number of cable-to-PCB connectors 770 may be reduced to twelve. As another example, if the tubular reflector assembly 710 includes three panels 712, with one linear array 750 per panel 712, then each RF signal would need to be passed to the feed board PCBs 730 mounted on all three panels 712. In this case, the antenna would include a total of two RF connector ports (one for each polarization), and a total of ten cable-to-PCB connectors, with, for example, six of the cable-to-PCB connectors connected to the first feed board PCB and two cable-to-PCB connectors connected to each of the second and third feed board PCBs. The first and second cable-to-PCB connectors that are attached to the first feed board PCB would be coupled to the respective first and second RF connector ports, the third and fourth cable-to-PCB connectors that are attached to the first feed board PCB would be coupled to the two cable-to-PCB connectors that are attached to the second feed board PCB via respective coaxial cables, and the fifth and sixth cable-to-PCB connectors that are attached to the first feed board PCB would be coupled to the two cable-to-PCB connectors that are attached to the third feed board PCB via respective coaxial cables.

The base station antenna 700 may have a number of advantages. For example, since the power dividers are implemented on the feed board PCBs, no additional feed line PCB is required. Since coaxial cables are used, the insertion loss may be lower. This may be important in larger antennas where the insertion loss associated with microstrip RF transmission lines may be too high. Additionally, the use of cable-to-PCB connectors 770 may significantly reduce the amount of room required on the feed board PCBs 730 for the RF connections to the feed board PCBs 730. This may allow reduction in the size of the feed board PCBs 730 and/or provide more room for other elements or allow for spacing the RF transmission lines on the feed board PCBs 730 farther apart (providing increased isolation). Moreover, the connection of the cable-to-PCB connectors 770 to the feed board PCBs 730 may be accomplished using solder joints that are applied to the outer surfaces of the feed board PCBs 730, simplifying assembly of the base station antenna 700.

Figure 8A:
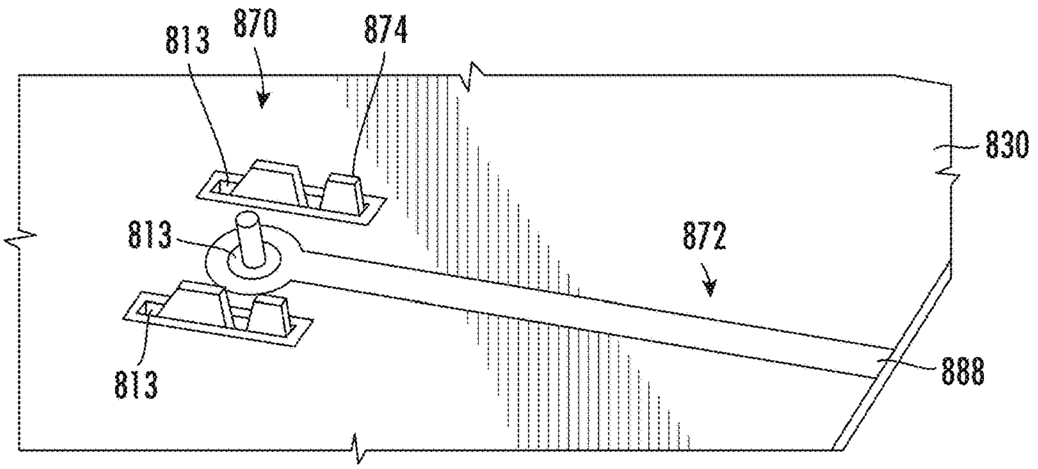
FIG. 8A is a schematic view of a connection between a cable-to-PCB connector and a feed board PCB included in a base station antenna according to further embodiment of the present invention.
Figure 8B:
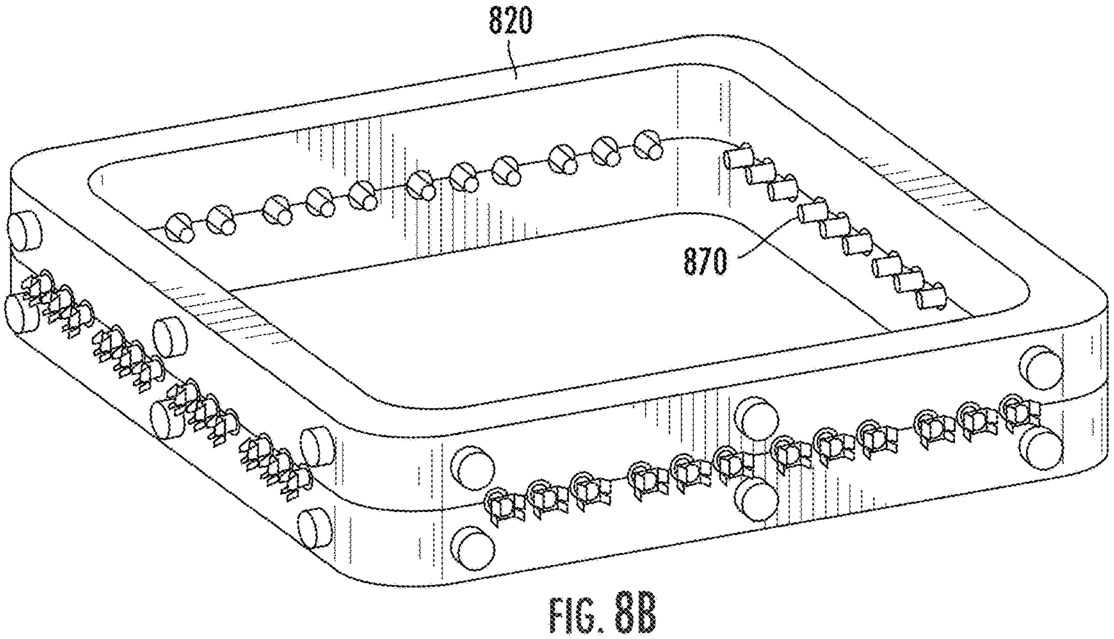
FIG. 8B is a perspective view of a dielectric support and cable-to-PCB connectors of the base station antenna of FIG. 8A.
Figure 8C:
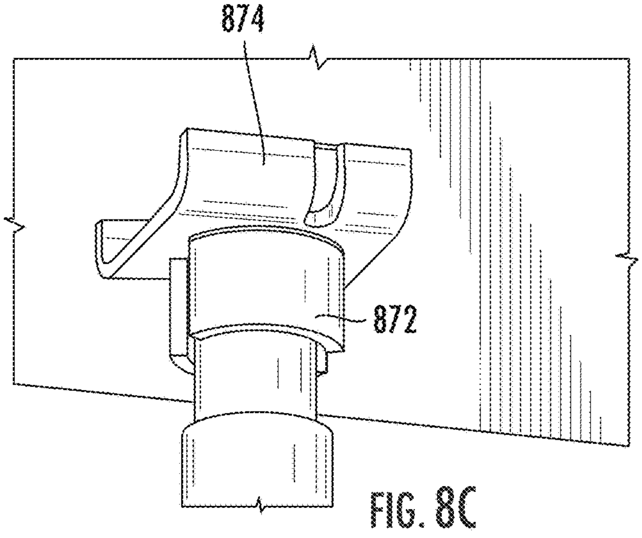
FIG. 8C is an enlarged perspective view of one of the cable-to-PCB connectors of the base station antenna of FIG. 8A.

FIGS. 7A-7E illustrate one example of a small cell base station antenna that uses cable-to-PCB connectors. It will be appreciated, however, that many variations may be made to the example embodiment shown in FIGS. 7A-7E. For example, FIGS. 8A-8C illustrate selected components of a base station antenna that is similar to base station antenna 700, but uses different cable-to-PCB connectors 870 that may be simpler and cheaper to manufacture as compared to the cable-to-PCB connectors 770. As can be seen, the cable-to-PCB connectors 870 comprise a metal band 872 that may be electrically connected to the outer conductor of a coaxial cable. The metal band 872 is connected (e.g., by soldering) to a ground connection element 874 that is configured to extend through a pair of openings 813 in a feed board PCB 830 of the antenna (see FIG. 8A). The center conductor of the coaxial cable may extend through a third opening 813 in the feed board PCB 830 where it may be electrically connected to a conductive trace 888 of an RF transmission line 882 on the feed board PCB 830. As other than the above differences the base station antenna of FIGS. 8A-8C may be identical to the base station antenna 700 discussed above, further description will be omitted herein.

Figure 9A:
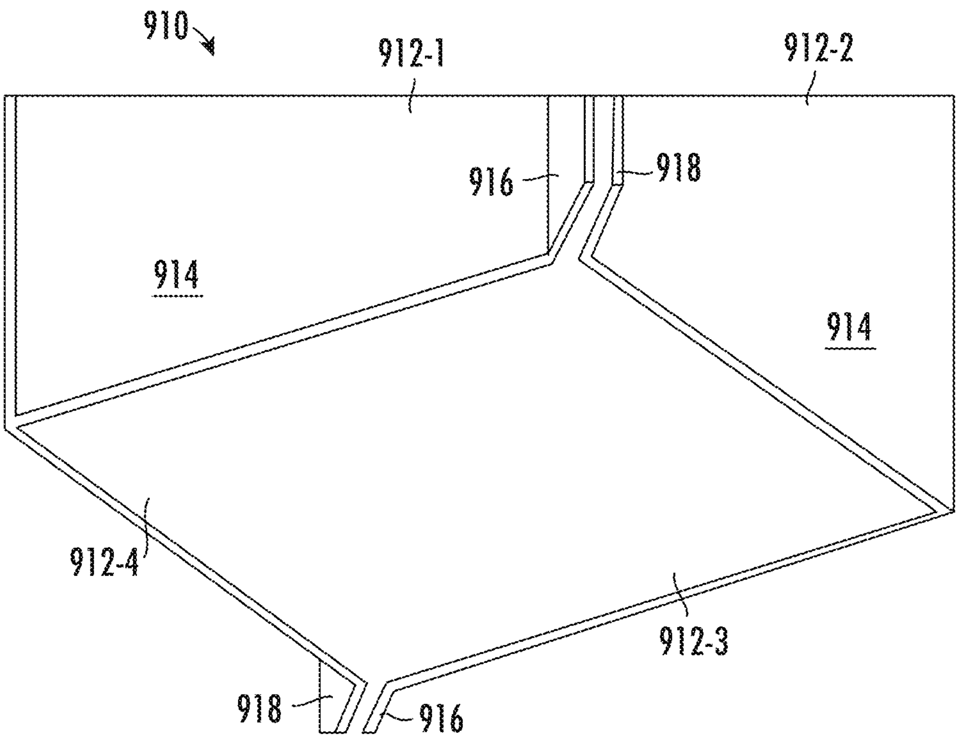
FIGS. 9A-9B are schematic views of base station antennas according to further embodiments of the present invention.
Figure 9B:
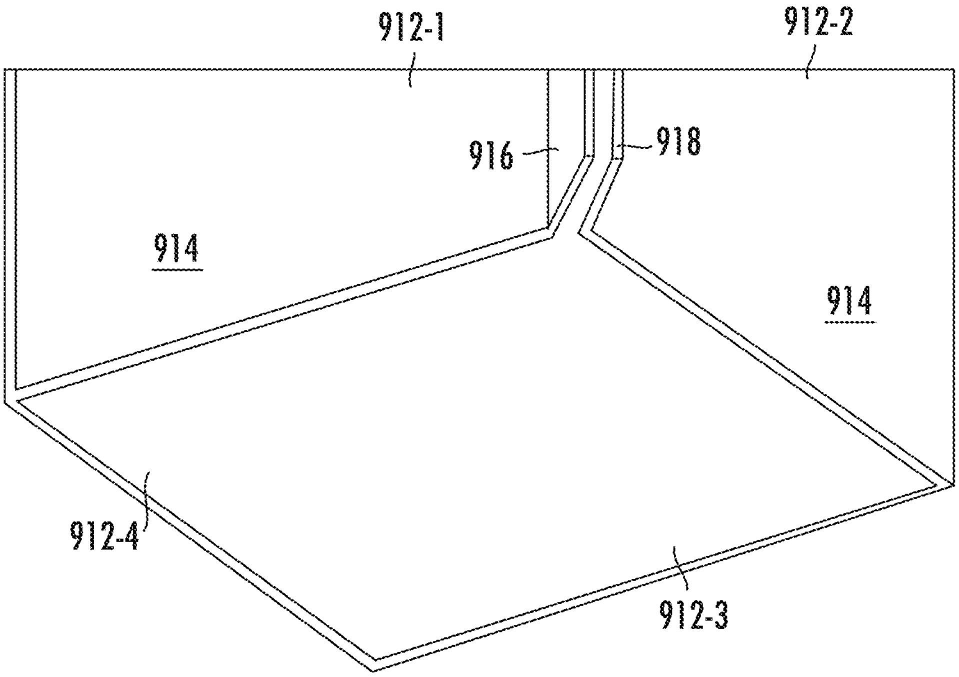

It will be appreciated that the above examples are merely illustrative in nature, and that many changes may be made thereto without departing from the scope of the present invention. For example, FIG. 9A is a schematic view of a tubular reflector assembly 910 of a base station antenna according to further embodiments of the present invention. As shown in FIG. 9A, the tubular reflector assembly 910 includes four panels 912-1 through 912-4. The first and second panels 912-1, 912-2 are formed integrally as a first monolithic structure, and the third and fourth panels 912-3, 912-4 are formed integrally as a second monolithic structure. The panels 912 may be similar to, for example, the panels 612 of base station antenna 600. However, the second longitudinally-extending outer lip 918 of panels 912-1 and 912-3 and the first longitudinally-extending outer lip 916 of panels 912-2 and 912-4 are omitted so that the central reflector plate 614 of panel 912-1 may directly (galvanically) connect to the central reflector plate 914 of panel 912-2 at a bend of the monolithic piece of sheet metal and so that the central reflector plate 914 of panel 912-3 may directly (galvanically) connect to the central reflector plate 914 of panel 912-4 at a bend of the monolithic piece of sheet metal. This approach still provides a modular reflector assembly having pieces that may be assembled separately, making fabrication easier, and may potentially provide a more consistent ground reference across the different panels of the tubular reflector assembly. Any of the base station antennas disclosed herein can have a tubular reflector assembly that has the design of FIG. 9A. Moreover, it will be appreciated that more than two panels may be formed as an integral monolithic unit in other embodiments. For example, FIG. 9B illustrates another tubular reflector assembly in which all four panels are implemented as a monolithic structure that has one first longitudinally-extending outer lip 916 and one second longitudinally-extending outer lip 918.

Figure 10:
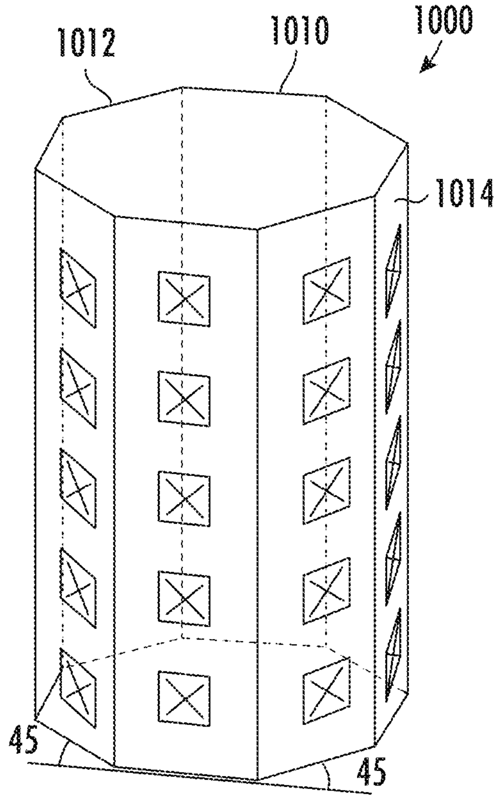
FIG. 10 is a schematic view of a base station antenna according to still further embodiments of the present invention.

As another example, FIG. 10 schematically illustrates a tubular reflector assembly 1010 of a base station antenna 1000 according to further embodiments of the invention. As can be seen, the tubular reflector assembly 1010 includes a total of eight panels 1012, which each includes a central reflector plate 1014 that defines a plane that intersects the planes defined by the two adjacent central reflector plates 1014 at angles of 45°. While not shown in FIG. 10 for simplicity, it will be appreciated that each of the eight panels 1012 may have the design of panel 612 of base station antenna such that the panel has a central reflector plate 1014 and first and second longitudinally-extending outer lips (not shown in FIG. 10). Thus, it will be appreciated that any appropriate number of panels 1012 may be included in the tubular reflector assemblies according to embodiments of the present invention, including three, four, five, six, eight, nine, ten, twelve, fifteen, sixteen or other numbers of panels.

The base station antenna 600 described above includes a feed line PCB 670 that has a plurality of tabs 684 that are used to form tab-through-PCB connections 690 with the feed board PCBs 630. It will be appreciated, however, that in other embodiments, the tab-through-PCB connections may instead be formed using tabs on the feed board PCBs that are received within corresponding openings in the feed line PCB(s). FIGS. 11A-11D illustrate a base station antenna 1100 according to further embodiments of the present invention that takes such an approach. The base station antenna 1100 of FIGS. 11A-11D is a so-called thin wall donut style antenna, but it will be appreciated that a wide variety of different antennas could employ this design.

Figure 11A:
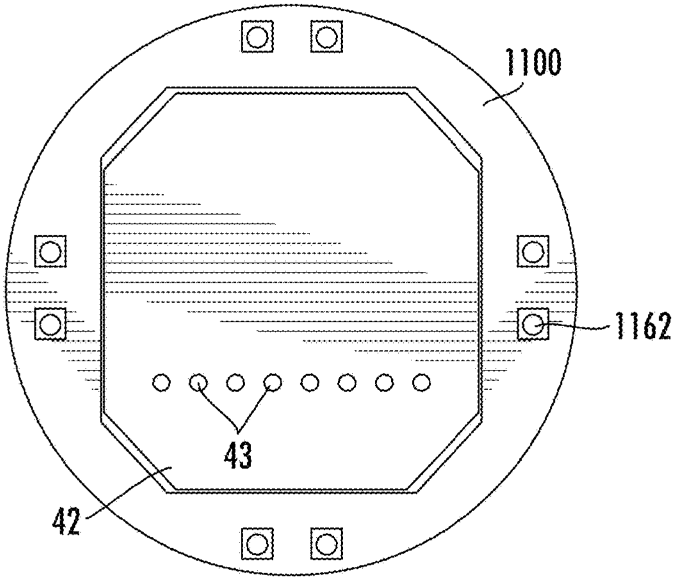
FIG. 11A is a schematic bottom view of a base station antenna according to still further embodiments of the present invention.

Referring first to FIG. 11A, which is a schematic bottom view of the base station antenna 1100, it can be seen that the antenna 1100 may surround a remote radio head 42. The antenna 1100 thus may have a cylindrical shape with an open interior, and the remote radio head 42 may be mounted in the open interior. The remote radio head 42 includes a plurality (here eight) of RF radio ports 43. The antenna 1100 may include a top cap (not shown) that covers the other components of the antenna 1100 and the remote radio head 42 to protect them from the environment.

Figure 11B:
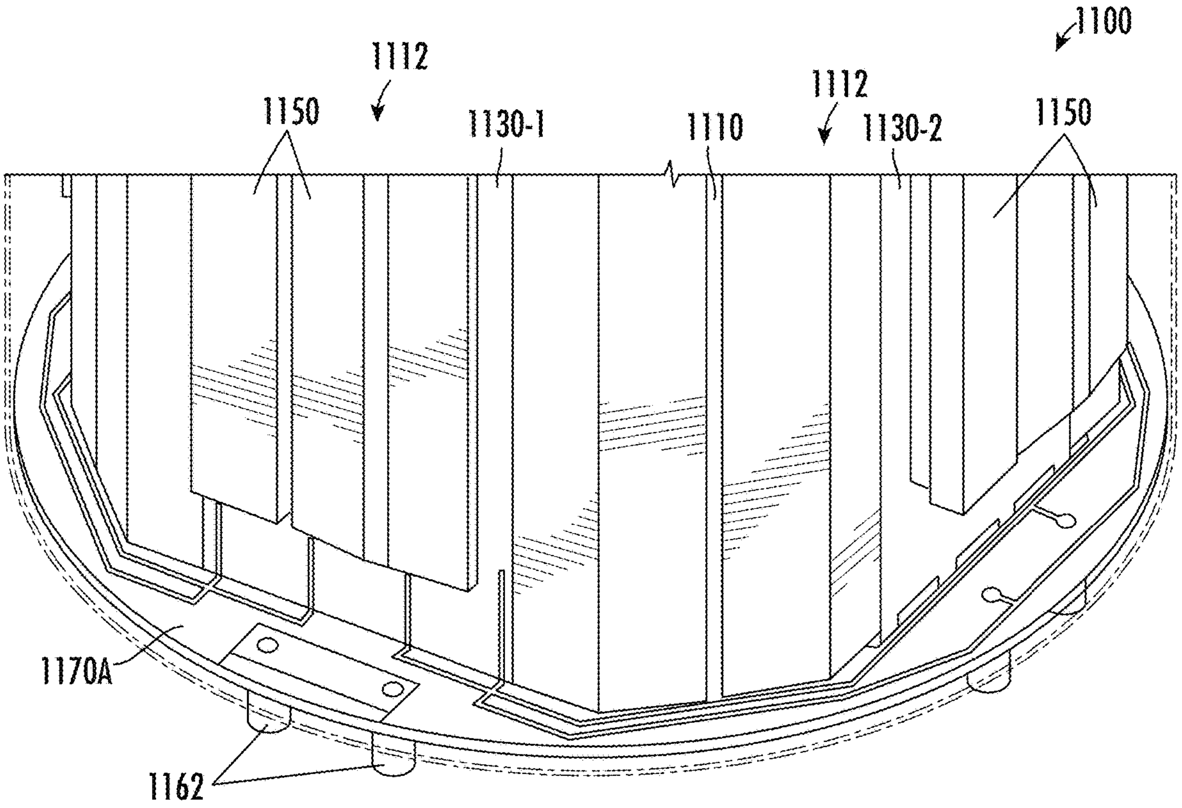
FIG. 11B is a schematic perspective view of a bottom portion of the base station antenna of FIG. 11A.

FIG. 11B is a schematic perspective view of a bottom portion of the base station antenna 1100. The antenna 1100 includes a tubular reflector assembly 1110 (which is mostly not visible in FIGS. 11A-11D). The tubular reflector assembly 1110 includes four primary panels 1112 that each have a respective feed board PCB 1130 mounted thereon. Two linear arrays of radiating elements 1150 are mounted on each feed board PCB 1130. The linear arrays 1150 are shown schematically in FIG. 11B using vertically extending rectangular blocks to simplify the drawings. Each linear array 1150 can be similar or identical to the linear arrays 650 shown in FIG. 5A. The tubular reflector assembly 1110 may have the design of any of the tubular reflector assemblies according to embodiments of the present invention discussed above so further description thereof will be omitted. The panels 1112 are not visible in FIG. 11B since the feed board PCBs 1130 cover the two panels that would otherwise be visible in FIG. 11B and hide these panels 1112 from view. The location of each two panel 1112 (behind the respective feed board PCBs 1130) is indicated by the arrows in FIG. 11B. The linear arrays 1150 that are mounted on each panel 1112 may comprise, for example, first and second linear arrays 1150 that operate in the same frequency band or first and second linear arrays 1150 that operate in different frequency bands. Typically, each panel 1112 will have the same combination of linear arrays 1150 mounted thereon.

Still referring to FIG. 11B, the feed boards 1130 extend upwardly from a feed line PCB 1170. The feed line PCB 1170 in this particular embodiment is implemented as a first feed line PCB 1170A and a second feed line PCB 1170B that are arranged in a vertically-stacked arrangement. The feed line PCB 1170 is mounted at (or near) the bottom of the antenna 1100, beneath the feed board PCBs 1130. A plurality of RF connector ports 1162 extend downwardly from the feed line PCB 1170. The RF connector ports 1162 may, for example be mounted directly on the feed line PCBs 1170A, 1170B. A plurality of RF radio ports 43 (see FIG. 11A) are provided on the bottom of the remote radio head 42. Coaxial cables (not shown) may connect each RF radio port 43 to a respective one of the RF connector ports 1162. After the coaxial cables are installed, a bottom end cap (not shown) may be mounted on the bottom of antenna 1100 to cover the RF connector ports 1162 and to protect the remote radio head 42 and the other components of the antenna 1100 from the environment.

As noted above, the feed line PCB 1170 is implemented in this particular embodiment using first and second feed line PCBs 1170A, 1170B. It will be appreciated, however, that in other embodiments, the feed line PCB 1170 may instead be implemented using a single PCB, as was the case in base station antenna 600 of FIGS. 5A-5G.

Figure 11C:
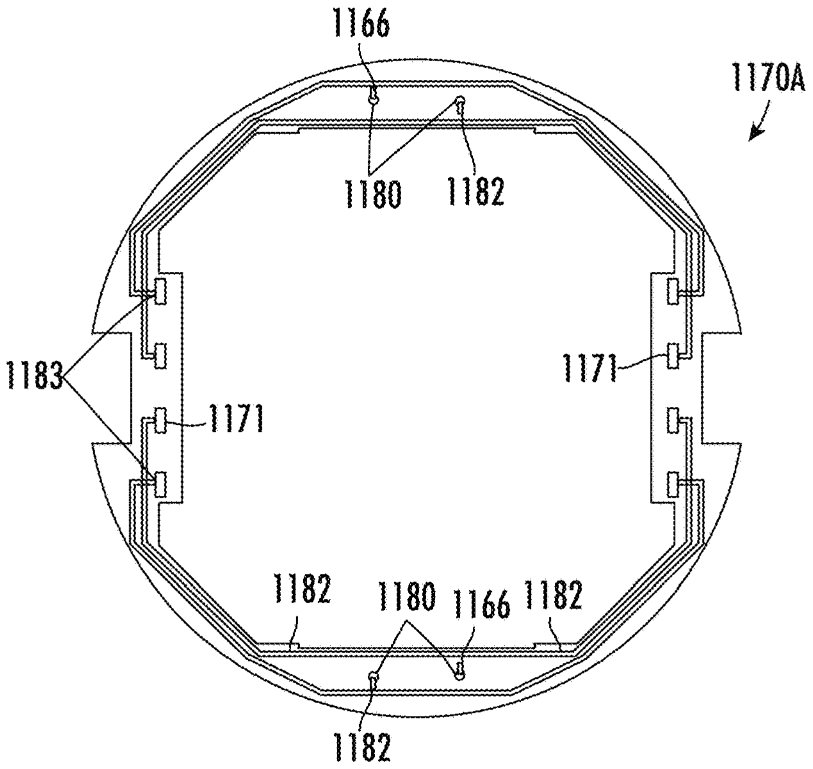
FIG. 11C is a top view of a feed line PCB of the base station antenna of FIG. 11A.

FIG. 11C is a top view of the first feed line PCB 1170A. The second feed line PCB 1170B may have a similar or even identical design. As shown in FIG. 11C, center contacts of four of the RF connector ports 1162 may extend through the feed line PCB 1170A to form input ports 1180 on the feed line PCB 1170A. The ground contacts of the RF connector ports 1162 (FIG. 11B) may be electrically connected to a ground plane that is formed on the bottom surface of the feed line PCB 1170A. Each input port 1180 is connected by a short RF transmission line 1182 to a 1×2 power divider 1166. Each power divider 1166 is implemented as a junction of three RF transmission lines 1182, with one RF transmission line 1182 acting as the input to the power divider 1166 and the other two RF transmission lines 1182 acting as outputs. It will be appreciated, however, that other types of power dividers may be used (e.g., Wilkinson power dividers). The RF transmission lines 1182 that form the two outputs of each power divider 1166 circle around the periphery of the feed line PCB 1170A to terminate on opposed sides of feed line PCB 1170A. This facilitates having the first output of a given power divider 1166 feed a first feed board PCB 1130 of antenna 1100 while the second output of the power divider 1166 feeds a second feed board PCB 1130 of antenna 1100 that is opposite the first feed board 1130. As can be seen from FIG. 11C, a total of eight RF transmission lines 1182 extend from the outputs of the four power dividers 1166. As will be discussed below, these eight RF transmission lines 1182 on feed line PCB 1170A connect to respective RF transmission lines (not shown) on two of the feed boards 1130.

Still referring to FIG. 11C, two crossovers 1183 are provided where a first RF transmission line 1182 crosses a second RF transmission line 1182 on the feed line PCB 1170A. These crossovers 1183, which are shown schematically in FIG. 11C, may be implemented using any appropriate technique including, for example, using bridges such as the bridges 686 discussed above with reference to FIGS. 5D-5E. As another example, the crossovers 1183 may be implemented by removing a small section of the ground plane on the reverse side of feed line PCB 1170A that is underneath the crossover location and then using a plated through hole (not shown) to route one of the RF transmission line traces to the bottom side of the feed line PCB 1170A so that it can cross the other RF transmission line trace on a different layer of the feed line PCB 1170A and the trace on the bottom side of the feed line PCB 1170A may then be routed back to the top surface of the feed line PCB 1170A using a second plated through hole (not shown). The crossovers 1183 may be omitted in some embodiments.

Figure 11D:
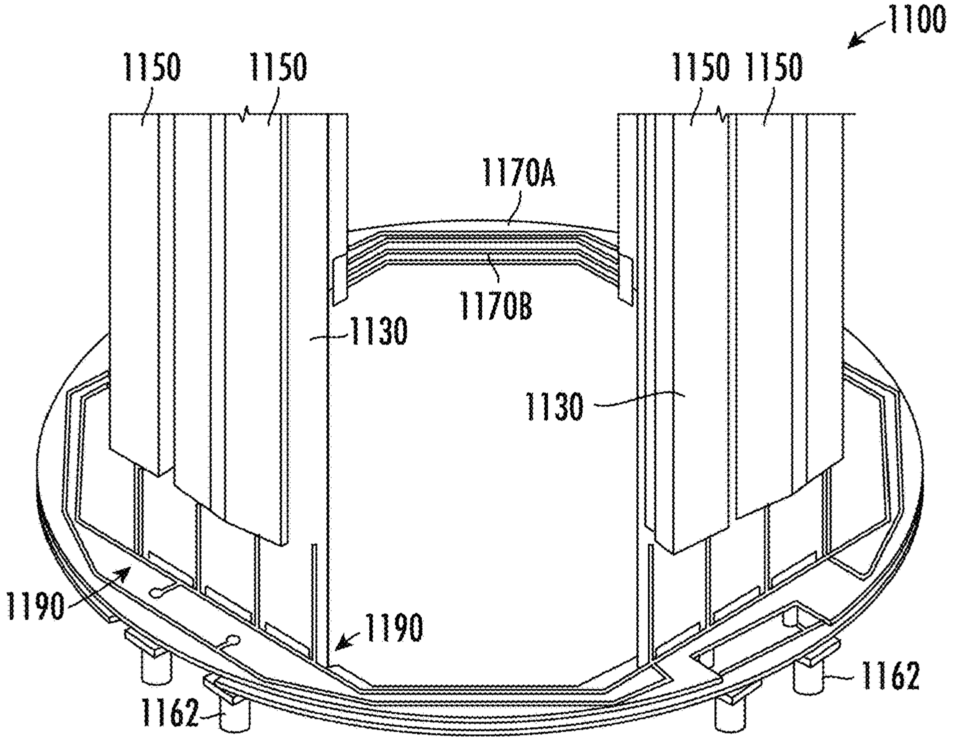
FIG. 11D is a schematic perspective view illustrating how feed board PCBs and feed line PCBs that are included in the antenna of FIG. 11A may be interconnected.

FIG. 11D illustrates how the two feed line PCBs 1170A, 1170B may be vertically stacked and how two feed board PCBs 1130 may be mounted thereon (the other two feed board PCBs 1130 are mounted in the same manner). As shown, feed line PCB 1170A may be rotated 90° with respect to feed line PCB 1170B so that the four pairs of RF connector ports 1162 are radially arranged every 90°. The feed line PCBs 1170A, 1170B may be vertically stacked and may be spaced apart from each other (e.g., using dielectric spacers) so as to be electrically isolated from each other.

While not fully visible in FIGS. 11A-11D, it will be understood that the feed line PCBs 1170A, 1170B may be physically and electrically connected to the feed board PCBs 1130 using tab-through-PCB connections 1190 in some embodiments. In antenna 1100, however, the tabs of the tab-through-PCB connections 1190 are implemented in the feed board PCBs 1130 and the openings that receive the tabs are implemented in the feed line PCBs 1170A, 1170B, which is the opposite of the tab-through-PCB connections 690 that are included in the base station antenna 600 discussed above. In other words, each feed board 1130 will include a plurality of tabs that may look identical to the tabs 684 shown in FIGS. 5F-5G. Likewise, the feed line PCBs 1170A, 1170B may include corresponding openings in the form of slits 1171 that may look identical to the slits 632 shown in FIGS. 5F-5G. The tabs on the feed board PCBs 1130 may extend through openings (e.g., slits) 1171 in the feed line PCB 1170 and be soldered in place so that tab-through-PCB connections 1190 are formed that electrically connect RF transmission lines 1182 on the feed line PCB 1170 to corresponding RF transmission lines (not shown) on the feed board PCBs 1130.

A total of sixteen tab-through-PCB connections 1190 are provided, with four such connections provided to each feed board PCB 1130. Two (opposed) of the feed board PCBs 1130 are physically mounted on the first feed line PCB 1170A and the other two of the feed board PCBs 1130 are physically mounted on the second feed line PCB 1170B.

While tab-through-PCB connections may be used to connect the feed line PCBs to the feed board PCBs, it will be appreciated that embodiments of the present invention are not limited thereto. For example, in other embodiments the feed line PCBs 1170A, 1170B may be mounted on the feed board PCBs via an interference fit and solder joints, thereby eliminating the need for tab-through-PCB connections. Since the feed board PCBs 1130 are mounted on the panels 1112 of a sturdy tubular reflector assembly 1110.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some elements may not be to scale.

Spatially relative terms, such as “under”, “below”, “lower”, “over”, “upper”, “top”, “bottom” and the like, may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as “under” or “beneath” other elements or features would then be oriented “over” the other elements or features. Thus, the exemplary term “under” can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression “and/or” includes any and all combinations of one or more of the associated listed items.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

That which is claimed is:

1. A base station antenna, comprising:

a first dielectric support;

a second dielectric support; and a reflector assembly having at least a first panel, a second panel and a third panel that are angled with respect to each other and that define an inner cavity, wherein each of the first through third panels is mounted to both the first dielectric support and the second dielectric support and the first and second dielectric supports are at least partly within the inner cavity, wherein the first panel is capacitively coupled to the second panel.

2. The base station antenna of claim 1, wherein the second panel is capacitively coupled to the third panel, and the first panel is also capacitively coupled to the third panel.

3. The base station antenna of claim 1, wherein the first panel includes a longitudinally-extending first central reflector plate that has a first feed board printed circuit board ("PCB") mounted thereon and first and second longitudinally-extending outer lips on either side of the first central reflector plate that are angled with respect to the first central reflector plate by angles of −45° and 45°, respectively, and the second panel includes a longitudinally-extending second central reflector plate that has a second feed board printed circuit board ("PCB") mounted thereon and third and fourth longitudinally-extending outer lips on either side of the second central reflector plate that are angled with respect to the second central reflector plate by angles of −45° and 45°, respectively.

4. The base station antenna of claim 3, wherein the second longitudinally-extending outer lip of the first panel is configured to form a plate capacitor with the third longitudinally-extending outer lip of the second panel.

5. The base station antenna of claim 1, wherein the first panel is integral with the third panel.

6. The base station antenna of claim 1, the reflector assembly further comprising a fourth panel, wherein the first panel is also capacitively coupled to the fourth panel, and wherein the second longitudinally-extending outer lip of the first panel is configured to form a plate capacitor with the first longitudinally-extending outer lip of the fourth panel, and the first longitudinally-extending outer lip of the third panel is configured to form a plate capacitor with the second longitudinally-extending outer lip of the fourth panel, the base station antenna further comprising:

a first feed board PCB which includes a first radio frequency ("RF") transmission line, the first feed board PCB mounted on of the first panel;

a second feed board PCB which includes a second RF transmission line, the second feed board PCB mounted on the third panel; and a feed line PCB that includes a third RF transmission line that connects directly to the first RF transmission line via a first tab-through-PCB connection and a fourth RF transmission line that connects directly to the second RF transmission line via a second tab-through-PCB connection.

7. The base station antenna of claim 6, wherein the first tab-through-PCB connection comprises a first tab on the feed line PCB that extends through a first opening in the first feed board PCB, the third RF transmission line extending onto the first tab and through the first opening, and the second tab-through-PCB connection comprises a second tab on the feed line PCB that extends through a second opening in the second feed board PCB, the fourth RF transmission line extending onto the second tab and through the second opening.

8. The base station antenna of claim 7, wherein the feed line PCB further includes a power divider, and the third RF transmission line is connected to a first output of the power divider and the fourth RF transmission line is connected to a second output of the power divider.

9. The base station antenna of claim 6, the base station antenna further comprising a third feed board PCB that is mounted outwardly of the second panel, the third feed board PCB including a fifth RF transmission line, wherein the second panel is opposite the fourth panel, and a fourth feed board PCB that is mounted outwardly of the fourth panel, the fourth feed board PCB including a sixth RF transmission line.

10. The base station antenna of claim 9, wherein the feed line PCB includes a plurality of bridges.

11. The base station antenna of claim 1, wherein a plurality of cable-to-printed circuit board ("PCB") connectors are mounted in the first dielectric support.

12. The base station antenna of claim 1, the reflector assembly further comprising a fourth panel, wherein the first panel is also capacitively coupled to the fourth panel.

13. The base station antenna of claim 1, wherein the third RF transmission line comprises a microstrip transmission line having a feed trace on a first side of a dielectric substrate of the feed line PCB and a ground plane on a second side of the dielectric substrate of the feed line PCB, wherein the feed trace extends through an opening in the first feed board PCB and is connected to a feed trace of the first RF transmission line via a first solder joint, and the ground plane extends through the opening in the first feed board PCB and is connected to a ground plane of the first RF transmission line via a second solder joint and an interlayer connection structure of the first feed board PCB.

14. A base station antenna, comprising:

a first dielectric support; and a reflector assembly having a first panel, a second panel, a third panel and a fourth panel that are angled with respect to each other, wherein the first dielectric support is at least partly within an inner cavity defined by the first through fourth panels, and each of the first through fourth panels is mounted to respective outer walls of the first dielectric support, wherein each of the first through fourth panels includes a longitudinally-extending central reflector plate that has a respective feed board printed circuit board ("PCB") mounted thereon and first and second longitudinally-extending outer lips on either side of the central reflector plate that extend outwardly from the central reflector plate at angles of 45° and −45°, respectively, and wherein the first outer lip of each of the first through fourth panels extends in parallel to the second outer lip on an adjacent one of the first through fourth panels and separated from the respective second outer lip by a respective gap so that each of the first through fourth panels is capacitively coupled to two other of the first through fourth panels.

15. The base station antenna of claim 14, wherein a first feed board printed circuit board ("PCB") is mounted on the first central reflector plate and a second feed board PCB is mounted on the second first central reflector plate, where the first feed board PCB includes a first radio frequency ("RF") transmission line and the second feed board PCB includes a second RF transmission line; the base station antenna further comprising a feed line PCB that includes a third RF transmission line that connects directly to the first RF transmission line via a first tab-through-PCB connection and a fourth RF transmission line that connects directly to the second RF transmission line via a second tab-through-PCB connection.

* * * * *